3,319,395
MAIL HANDLING DEVICE
Ingemar H. Lundquist, Belmont, and Charles W. Wiedeman, Castro Valley, Calif., assignors to Friden, Inc., a corporation of Delaware
Filed June 17, 1964, Ser. No. 375,809
15 Claims. (Cl. 53—189)

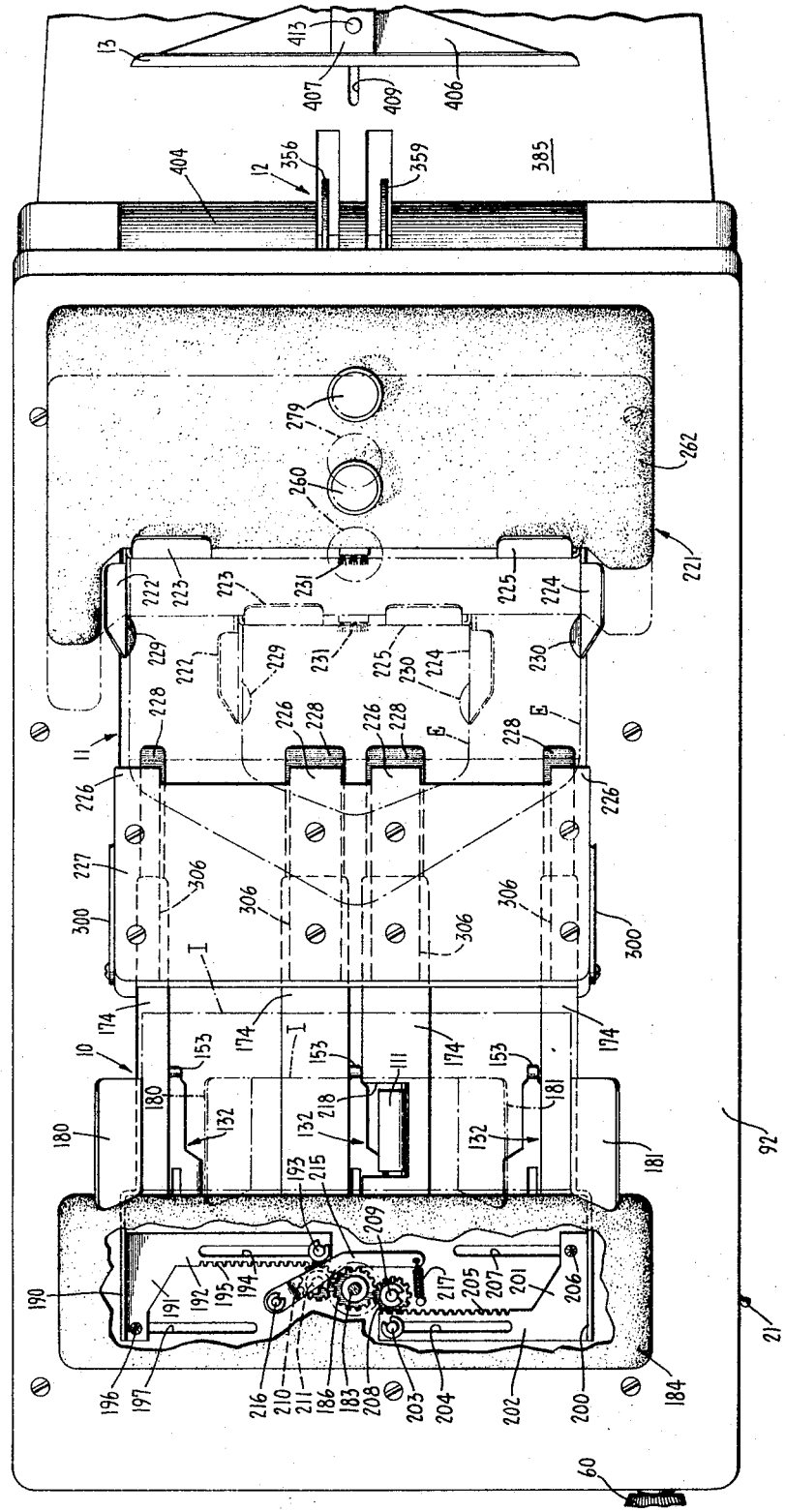

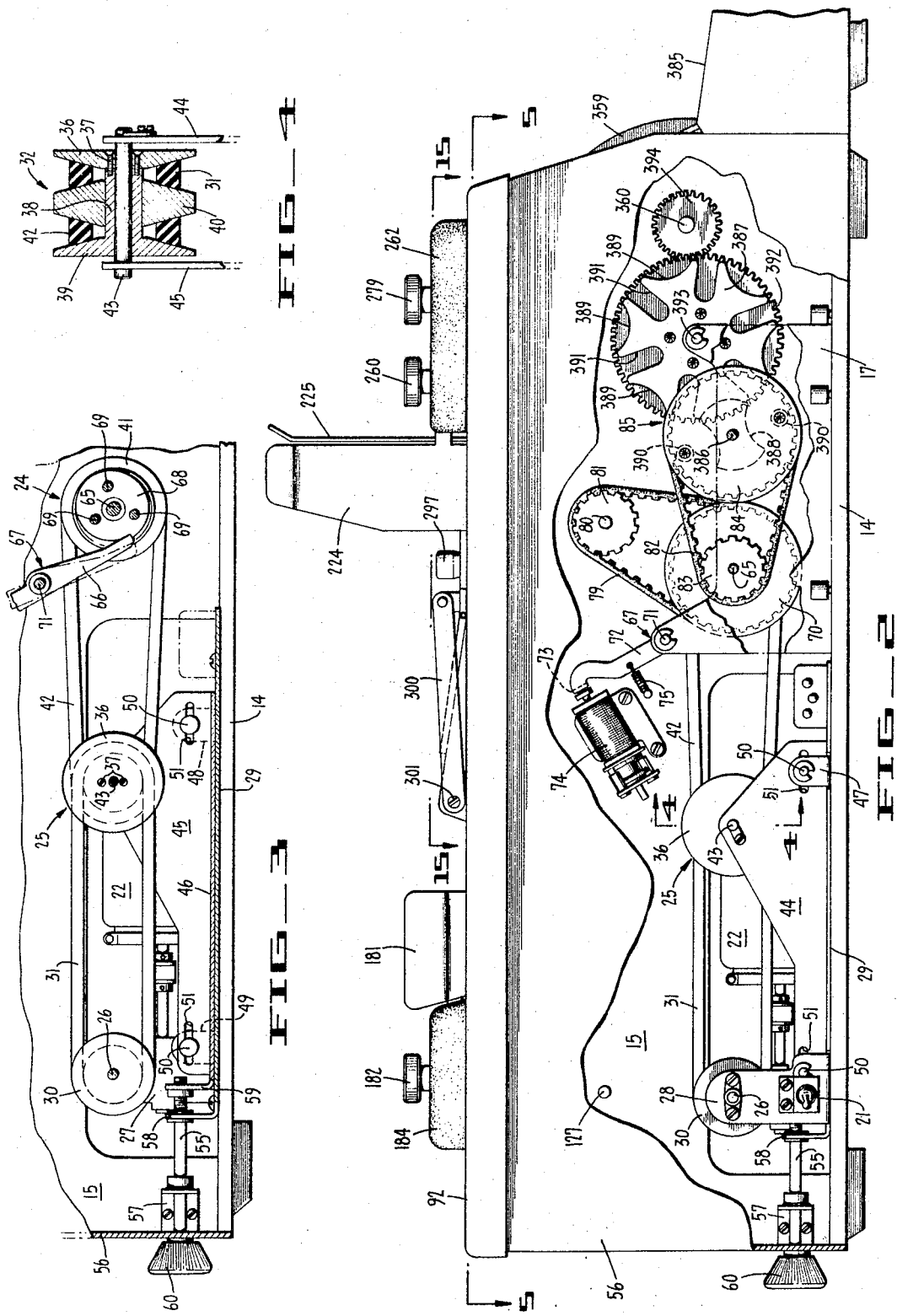

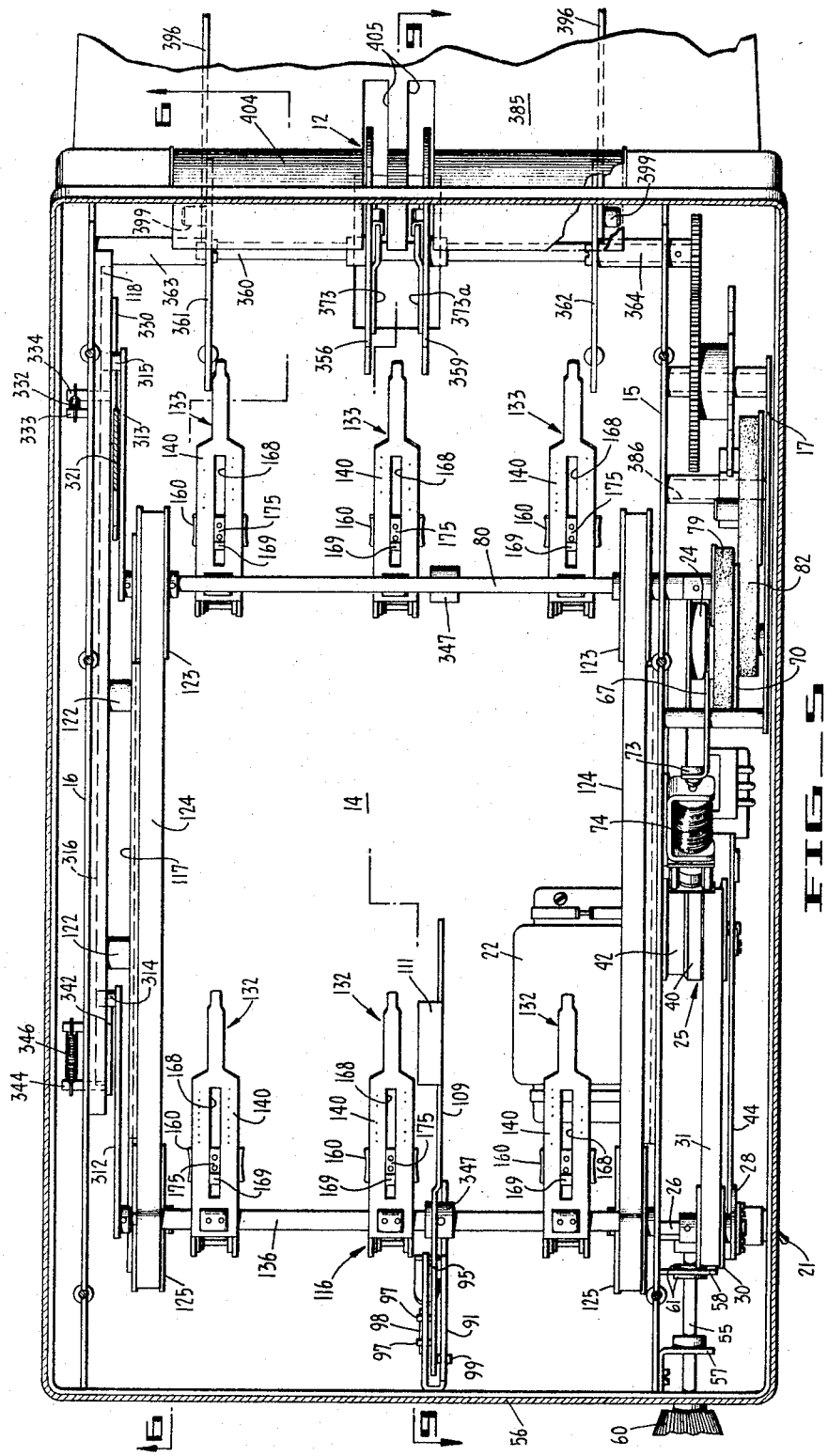

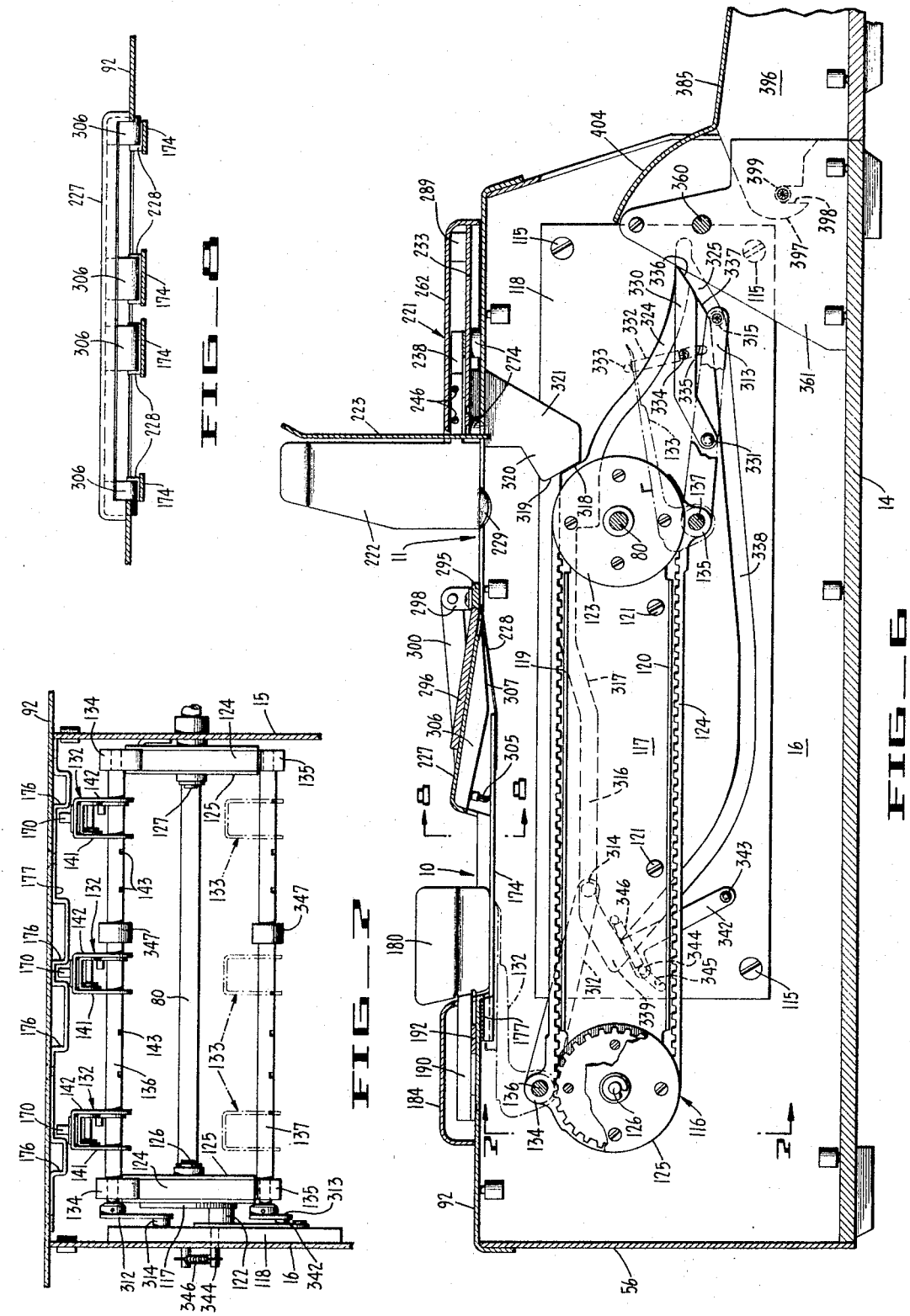

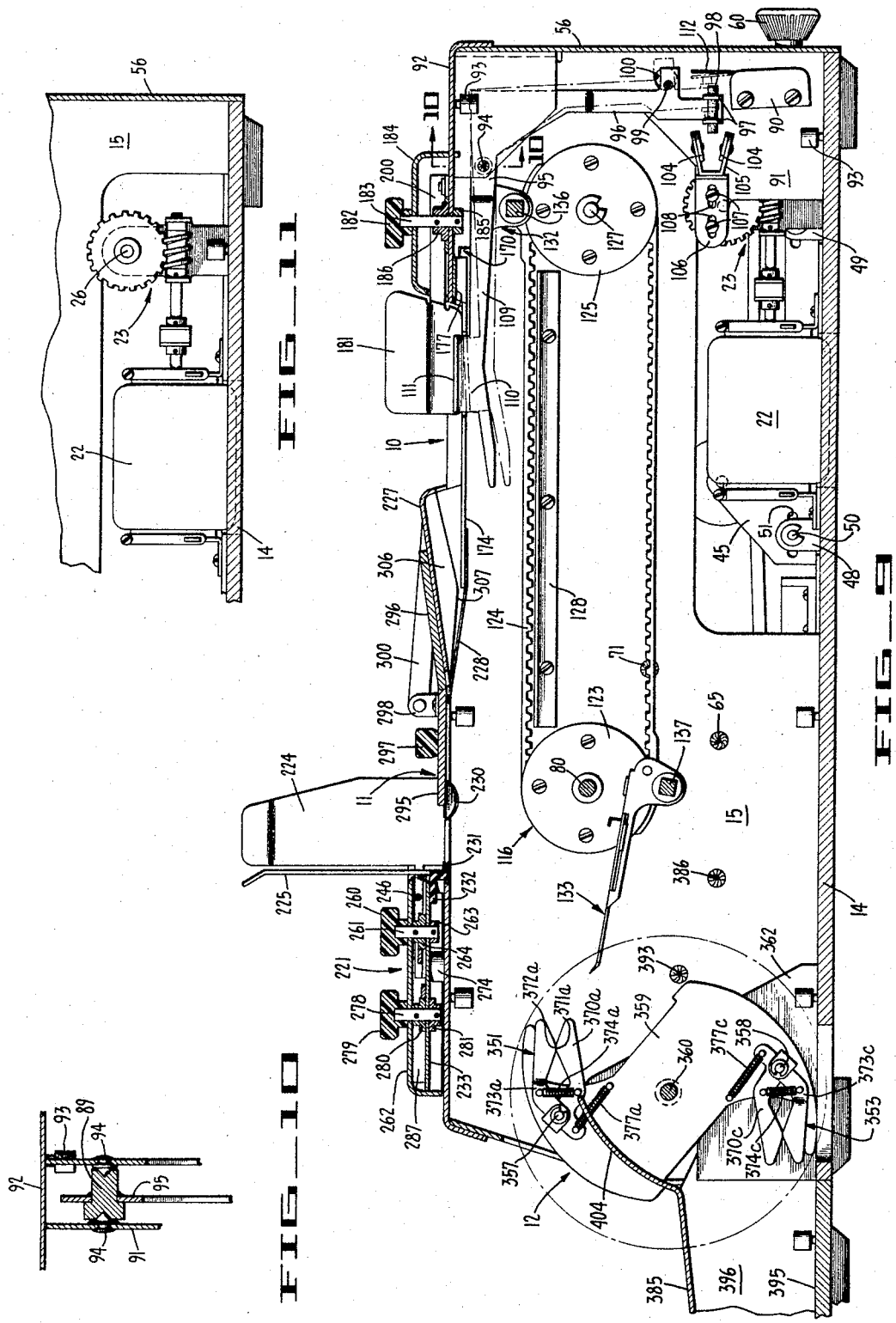

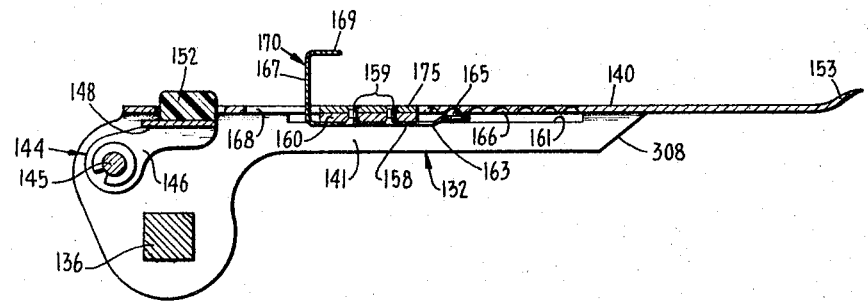
FIG_14
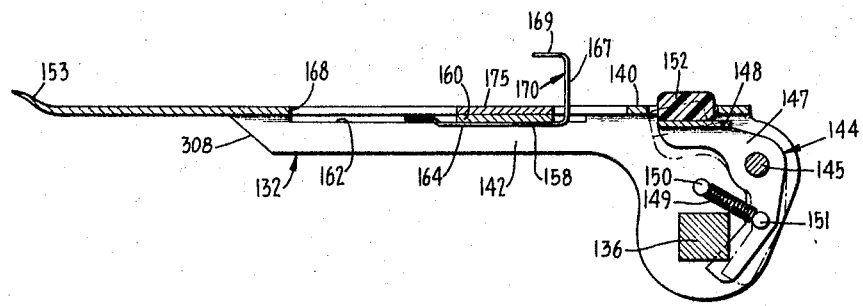
FIG_13
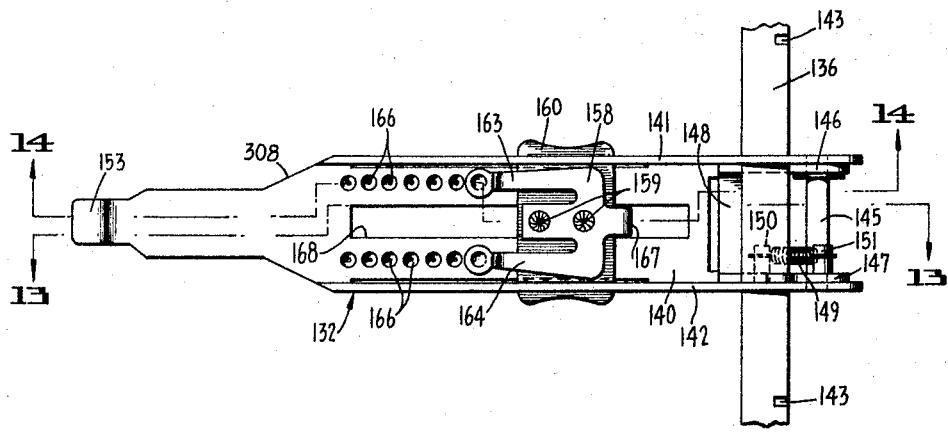
FIG_12

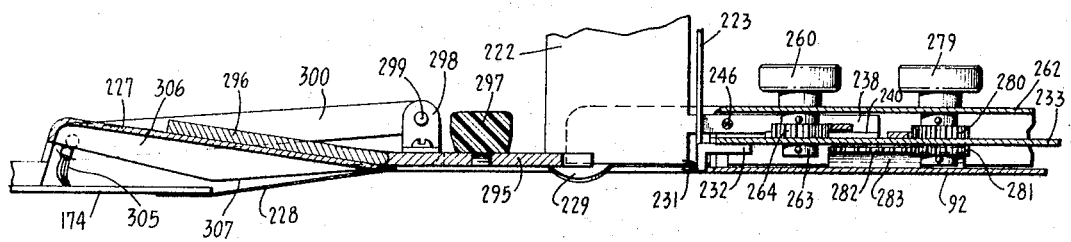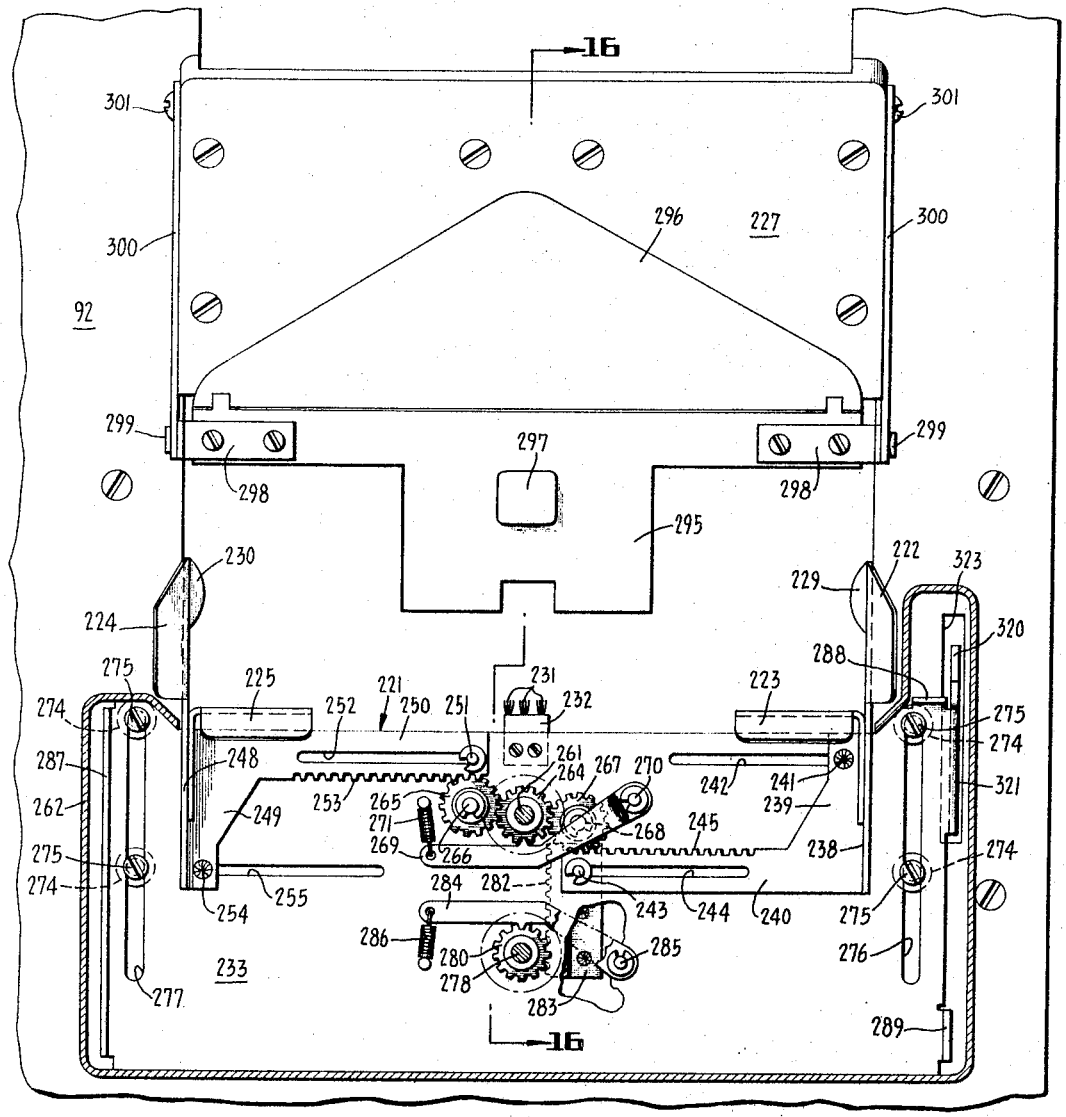

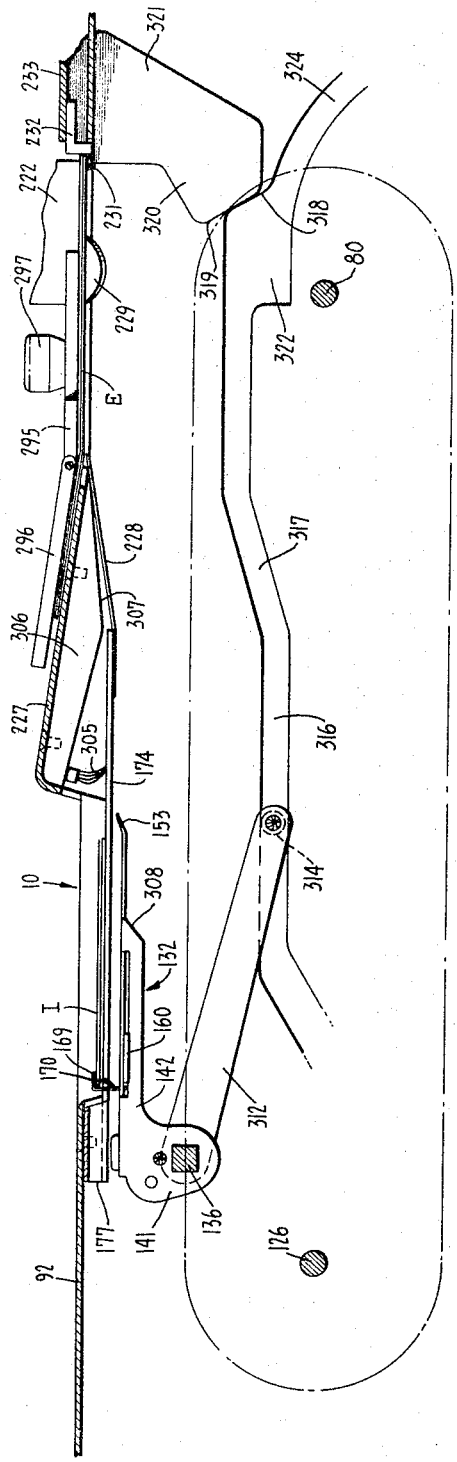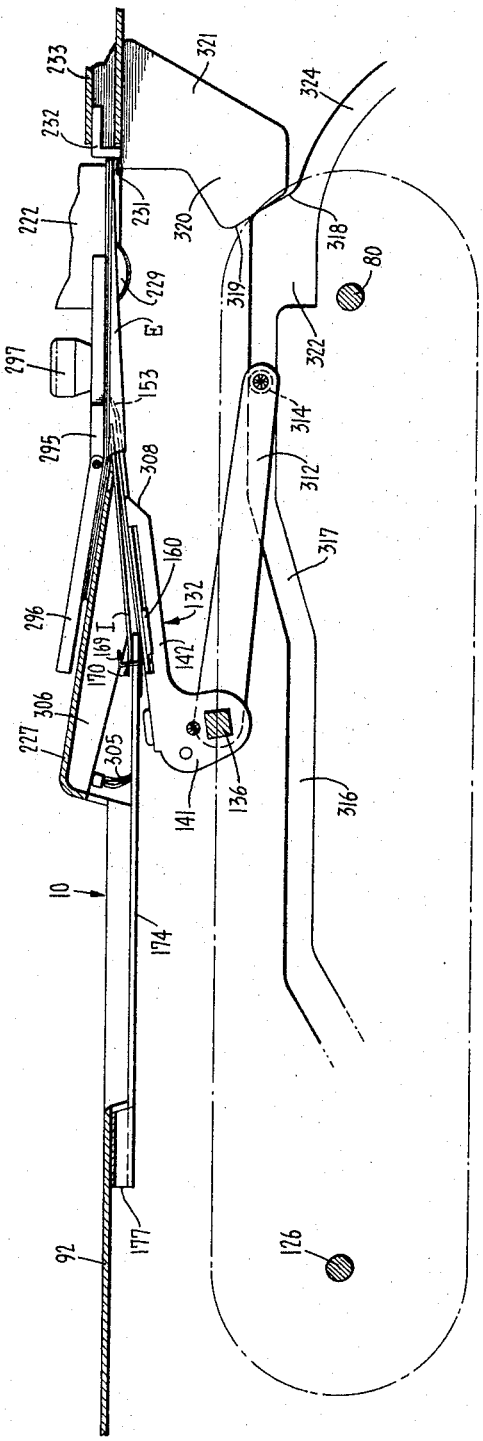

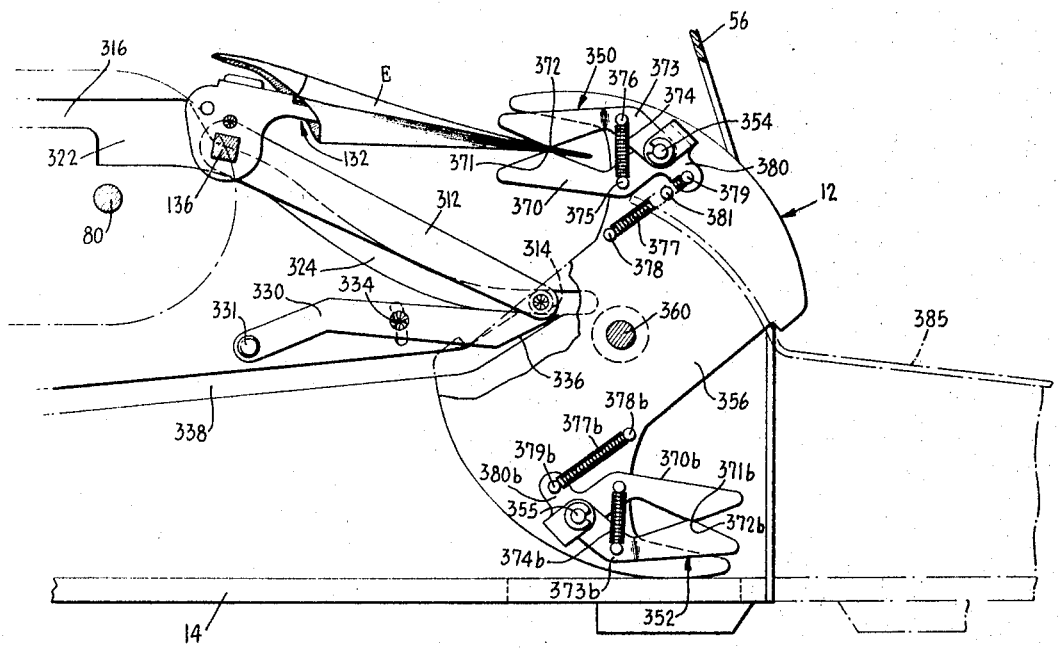
FIG_19
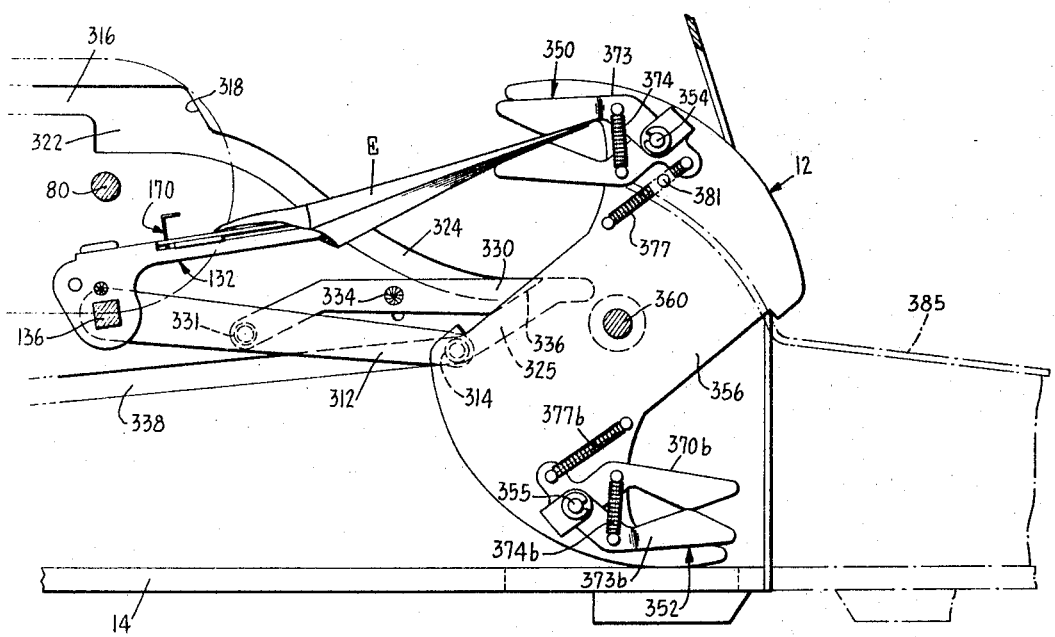
FIG_20

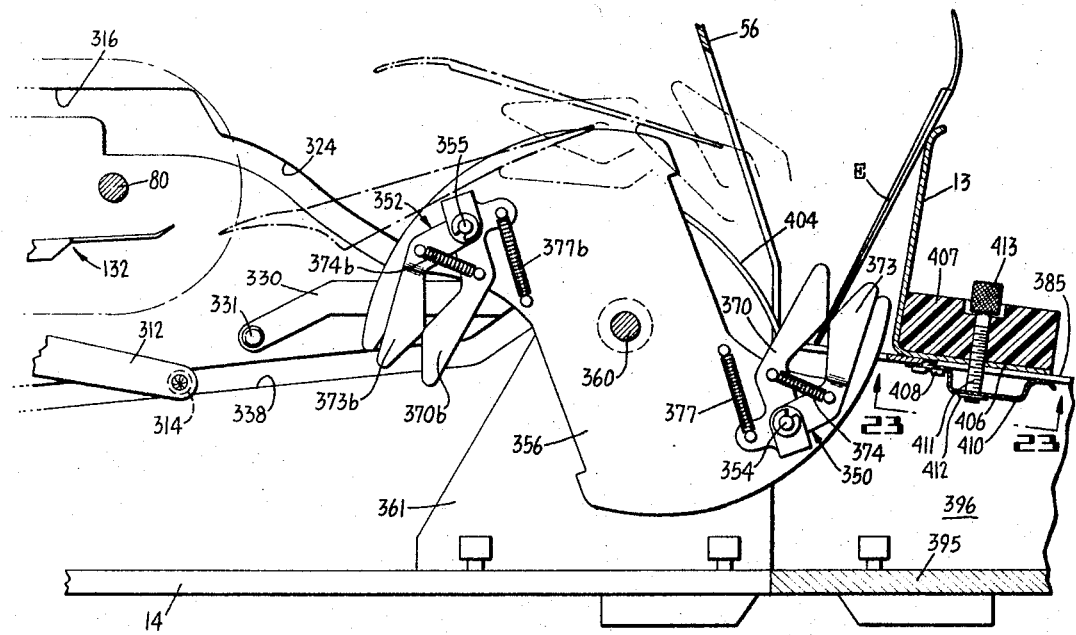
FIG_21
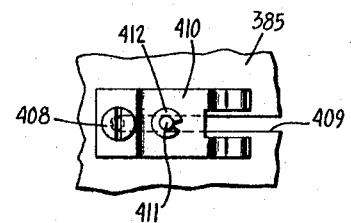
FIG_23
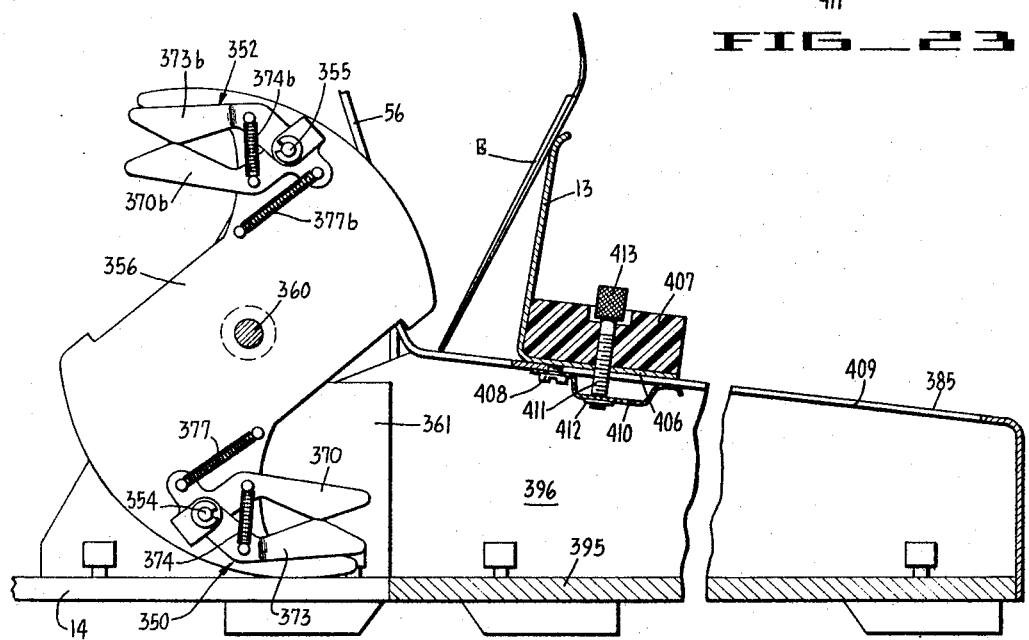
FIG_22

This invention relates to mail handling equipment and more particularly to an envelope stuffing device.

It is an object of the present invention to provide an improved mechanism for feeding letters and other mailing material from a pickup station to a position for insertion into an envelope.

Another object of the invention is to provide an improved mechanism for effecting the feeding and insertion of mail matter into envelopes and the stacking of the envelopes thereafter.

A further object of the invention is to provide a plurality of elements for feeding an insert into stuffing position, opening the mouth of an envelope, stuffing the insert thereinto, and thereafter removing the stuffed envelope from a stack of envelopes for transference to a stacking position.

Other objects and advantages of the invention will be apparent from the following description of a preferred embodiment as illustrated in the accompanying drawings in which:

FIG. 1 is a plan view of the device with a portion of the cover of the insert gauge broken away to more clearly show the adjustment therefor;

FIG. 2 is an elevational view of the device with a portion of the side cover broken away to more clearly show the drive mcehanism;

FIG. 3 is a fragmentary elevational view of the speed control mechanism and the cyclic clutch;

FIG. 4 is a sectional detail of the variable speed pulley assembly taken on the plane indicated by line 4—4 in FIG. 2;

FIG. 5 is a plan view of the device with the top cover removed to show the feeding and stacking mechanism, the view being taken on the plane indicated by the line 5—5 in FIG. 2;

FIG. 6 is a longitudinal sectional elevational view taken on the planes indicated by lines 6—6 in FIG. 5;

FIG. 7 is a fragmentary transverse sectional elevational view taken on the plane indicated by line 7—7 in FIG. 6;

FIG. 8 is a fragmentary transverse sectional elevational view taken on the plane indicated by line 8—8 in FIG. 6;

FIG. 9 is a longitudinal sectional elevational view showing the cyclic clutch switch control mechanism, the view being taken on the planes indicated by lines 9—9 in FIG. 5;

FIG. 10 is a sectional detail of the clutch control switch actuator mounting, the view being taken on the plane indicated by line 10—10 in FIG. 9;

FIG. 11 is an elevational detail of the motor drive mechanism;

FIGS. 12, 13 and 14 are enlarged details of the insert feeding fingers, the view in each of FIGS. 13 and 14 being taken on the planes indicated by lines 13—13 and 14—14, respectively, in FIG. 12;

FIG. 15 is a fragmentary plan view of the device, showing the envelope hopper and adjustments therefor, the view being taken on the plane indicated by the line 15—15 in FIG. 2;

FIG. 16 is a fragmentary sectional elevational view taken on the plane indicated by line 16—16 in FIG. 15;

FIGS. 17, 18, 19, 20, 21 and 22 are diagrammatic showings of the various phases in the feeding and insertion of mail matter into an envelope and the stacking of the stuffed envelope; and FIG. 23 is a detail of the stacker plate adjustment means, the view being taken on line 23—23 in FIG. 21.

In this envelope stuffing device, mail matter, such as folded letters, cards and the like are positioned in a pickup station whereupon a weight responsive switch is actuated to initiate a cycle of machine operation. During each such machine cycle, the insert is transported by a series of adjustable fingers to a position wherein the mouth of the lowermost envelope in a stack of envelopes is opened by the fingers for the introduction of the insert thereinto. As the stuffing operation is completed, the transport fingers transfer the stuffed envelope from the stack into the grasp of a set of grippers of the inactive stacking mechanism. At which time, the operative series of fingers are partially removed from the stuffed envelope concluding the cycle of machine operation. During the first portion of the ensuing machine cycle, the previously stuffed envelope is deposited in an edgewise stacked position on a stacking tray.

Referring to FIG. 1, the machine embodying the present invention includes means for transporting an insert I, such as a letter and/or other mailing material, from the pickup station, generally indicated at 10, to a position wherein the mouth of the lowermost envelope E in a stack of envelopes is opened for the introducton of the insert I therein. As the stuffing operation is completed, the stuffed envelope E is removed from the supply hopper, generally indicated at 11, for transference to the stacker mechanism, generally indicated at 12, which is effective to deposit the stuffed envelope on edge against the stacking plate 13. The feeding and stuffing operation takes place during a single cycle of machine operation and is concluded with the transference of the stuffed envelope to the stacker mechanism 12. During the ensuing cycle, the stuffed envelope is deposited in stacked relationship against plate 13.

The feeding and stuffing mechanism, as well as the stacker mechanism, are suitably supported within the framework of the machine, which includes a base 14 (FIGS. 2 and 5) and a pair of side frames 15 and 16 secured thereon in spaced parallel relationship. An auxiliary frame member 17 is also secured on base 14 in vertically disposed spaced parallel relationship to side frame member 15 and serves to support the cyclically operable machine drive mechanism therebetween.

Upon operation of a switch 21, an electric motor 22 (FIGS. 2, 3, 5 and 11) secured on base 14, serves, through a worm and worm gear assembly 23, to impart continuous rotation to the driving side of a cyclically operable clutch 24 of a well-known type, through a variable speed control mechanism, generally indicated at 25. The worm gear of the worm and worm gear assembly 23 is secured on one end of a shaft 26 suitably journalled in upright members 27 and 28, formed at right angles to a plate 29 secured on base 14. A pulley 30 is also secured on shaft 26 adjacent upright member 28 and is drivingly connected by means of the V-belt 31 to one side of a variable speed pulley assembly 32 (FIG. 4). The variable speed pulley assembly 32 includes conical disk 36 which is secured by any suitable means, such as screws 37, on the end of the extended hub 38 of conical disk 39, the conical face of disk 39 being opposed to that of disk 36. Intermediate the disks 36 and 39 is a disk 40, axially slidable upon hub 38, and having opposed conical faces, one of which forms a V-groove with the face of disk 36 and the other of which forms a V-groove with the face of the disk 39. Movement of the disk 40 to the right or left (FIG. 4) serves to control the speed of pulley 41 secured to the driving side of clutch 24 (FIGS. 3 and 5), which pulley is drivingly connected to the variable speed pulley assembly 32 by means of the V-belt 42. The disk 39 and its hub 38, at one end of which disk 36 is secured, is rotatable upon shaft 43, suitably supported at its ends in respective flanges 44 and 45 of a channel member 46 (FIGS. 2, 3, 4 and 5) mounted for longitudinal sliding movement on plate 29. Channel member 46 rests on plate 29 and is disposed adjacent its one end between parallel ears 47 and 48, formed upwardly at a right angle to plate 29 and, at its other end, between upright member 28 and ear 49, which ear is also formed at a right angle to plate 29. In order to guide channel member 46 in its endwise movement, each of ears 48 and 49 carries a pin 50 engaged in corresponding horizontally disposed slots 51 in flange 45. Similarly, ear 47 and upright member 28 carry a pin 50 engaged in corresponding horizontally disposed slots 51 in flange 44.

It will become apparent that upon adjustment of channel member 46 to the right, as viewed in FIGS. 2 and 3, the V-groove formed by disks 36 and 40 will become wider, while the V-groove formed by the disks 39 and 40 will become narrower, thereby decreasing the pitch of the one and increasing the pitch of the other. Thus, the speed of the driving side of clutch 24 will be variably increased. Conversely, the adjustment of the channel member 46 to the left causes the V-groove formed by disk 39 and intermediate disk 40 to widen, while the V-groove formed by disk 36 and intermediate disk 40 becomes narrower, thereby decreasing the pitch of the former and increasing the pitch of the latter.

In order to control the adjustment of the channel member 46, a shaft 55 is provided (FIGS. 2, 3 and 5), supported along its length in the cover 56 of the machine, in a bushing secured to one arm of a right angle member 57 secured on side frame member 15 and in an ear 58 formed upwardly at a right angle to plate 29. At its one end, shaft 55 is provided with a threaded portion having a threaded engagement with a circular nut secured on ear 59 formed upwardly at a right angle to the web of the channel member 46. At its other end, shaft 55 carries a truncated, conical knob 60 secured thereon, adjacent the outer surface of the machine cover 56 for controlling rotation of the shaft. Intermediate the ends of the shaft 55, a pair of clips 61 are employed by engagement in annular slots in the shaft 55, one on each side of the ear 58, to prevent axial movement of the shaft. Thus, it becomes apparent that, when viewed from the left end in FIG. 3, a clockwise rotation of the knob 60 will effect an adjustment of the channel member 46 to the left, increasing the pitch of the pulley groove formed by disk 36 and intermediate disk 40, and decreasing the pitch of the pulley groove formed by disk 39 and intermediate disk 40, thereby decreasing the speed of rotation of the clutch 24. On the other hand, if a counter-clockwise rotation is imparted to knob 60, the channel member 46 is moved to the right (FIG. 3) thereby increasing the width of the groove formed by disk 36 and intermediate disk 40 to decrease the pitch thereof. At the same time, the width of the pulley groove formed by disk 39 and intermediate disk 40 is narrowed to increase the pitch thereof so that the pulley 41 associated with clutch 24 will rotate at a faster speed. Pulley 41, secured to the driving side of the clutch 24, is rotatably mounted upon shaft 65 journalled at its respective ends in side frame member 15 and auxiliary frame member 17.

Normally, clutch 24 is maintained in a disengaged condition by the engagement of the lower extremity of an arm 66 of clutch pawl 67 with a tooth, or shoulder, in the periphery of disk 68 (FIG. 3), secured to the driven side of the clutch by any suitable means, such as rivets or screws 69, which screws also serve to secure a 28-tooth pulley 70 (FIG. 2) to the driven side of the clutch 24, rotatable on shaft 65. Clutch pawl 67 is pivotally mounted upon shaft 71, intermediate its ends, which arm is supported in side frame member 15 and auxiliary frame member 17. At its upper end, the other arm 72 of clutch pawl 67 is provided with an ear 73, formed at a right angle thereto, for operative relationship with the enlarged end of the armature of solenoid 74, secured on side frame member 15. This relationship of the ear 73 with the end of the solenoid armature is maintained by spring 75, which also serves to resiliently retain the lower end of clutch pawl 67 in engagement with the shoulder of clutch disk 68. Thus, it can be seen that upon energization of solenoid 74, clutch pawl 67 is rocked clockwise (FIGS. 2 and 3) to the position indicated by phantom line, thereby enabling operation of clutch 24. It also becomes apparent that, upon de-energization of solenoid 74 prior to the completion of a single cycle of clockwise rotation of the clutch 24, the lower end of the pawl will be restored to its active position under the urgency of spring 75 for re-engagement with the shoulder on disk 68, thereby limiting the clutch to a single cycle of operation.

Upon engagement of clutch 24, each cycle of operation thereof becomes effective through 28-tooth pulley 70 and timing belt 79 to impart two complete revolutions to shaft 80 by means of the 14-tooth pulley 81 secured thereon (FIGS. 2 and 5). At the same time, a timing belt 82 passing over a 14-tooth pulley 83, integrally formed with pulley 70, imparts a one-half revolution, or 180° angular rotation, to the 28-tooth pulley 84. Such 180° rotation of pulley 84 becomes effective, through Geneva system 85, to control a 180° rotation of the stacker mechanism 12 in timed relationship to the operation of the insert feeding and stuffing mechanism, as will be described hereinafter.

Energization of solenoid 74, to effect engagement of clutch 24, is under the control of the normally opened Micro-Switch 90 (FIG. 9) secured on a vertically disposed plate 91 near the lower end thereof. Plate 91 is supported on base 14 and extends upwardly to the top cover 92, in which position it is held by means of the threaded engagement of suitable screws into circular nuts 93. At its upper end, a portion of plate 91 is formed substantially U-shaped to pivotally support a bellcrank 95 (FIGS. 9 and 10). The hub 89 of the bellcrank 95 is provided with axially aligned conical recesses in each end thereof engaged by corresponding conical pins 94, secured in axial alignment in the flanges of the U-shaped portion of plate 91. Thus, the bellcrank 95 is adapted to be rocked to-and-fro and is limited in its rocking movement by the engagement of a pin 99 on a lateral extension of the arm 96 with the wall of an aperture 100 in plate 91.

The bellcrank 95 serves as the actuating means for controlling closure of Micro-Switch 90 and its construction is such that it may readily be adjusted for operation by inserts of very light weight, such as onion skin paper, which is to be stuffed into the envelopes. At its lower end, the depending arm 96 of bellcrank 95 is provided with a pair of similar ears 97 formed thereon in spaced parallel relationship, one with the other, and each ear 97 has a circular aperture therein, which apertures are axially aligned. Into the apertures in the ears 97, a round permanent magnet 98 of a suitable length is press-fitted, having its ends extended approximately one-eighth inch beyond the respective ears 97.

Normally, bellcrank 95 is maintained in the full line position shown in FIG. 9 by the attraction of the permanent magnet 98 toward a mated pair of ferrous metallic plates 104, one of which is secured on each of the divergent legs of a substantially V-shaped bracket 105. The bracket 105 is supported on the lateral extension of a bracket 106, slidably mounted for adjustment on plate 91 by means of screws 107 engaged in elongated slots 108 of the bracket 106. By the adjustment of the bracket 106 to the right or left, the force required to rock bellcrank 95 from the full line position to the position indicated by phantom line will be increased or decreased, respectively.

In order to rock bellcrank 95 counter-clockwise (FIG. 9) in opposition to the magnetic attraction of the permanent magnet 98 toward the plates 104, a force is applied to the horizontally disposed arm 109. Arm 109 is provided near its free end with a vertical extension 110, the uppermost portion of which is formed at a right angle thereto, forming a flat surface, or pad, 111 upon which the inserts to be stuffed into the envelopes are placed. As the bellcrank 95 is rocked counter-clockwise (FIG. 9), in response to the weight of the insert and upon nearing the extent of its movement, as indicated by phantom line in FIG. 9, the permanent magnet 98 attracts the blade 112 of Micro-Switch 90, moving the blade to the left to its switch-closing position. Upon closure of switch 90, solenoid 74 becomes effective to cause engagement of clutch 24 for a single cycle of operation. Immediately prior to the termination of each cycle of operation of clutch 24, bellcrank 95 is rocked clockwise to the full line normal position shown in FIG. 9, thereby enabling opening of switch 90 to de-energize solenoid 74, as will be described hereinafter.

Upon engagement of clutch 24, means become effective to pick up an insert, such as a letter and/or other mailing material, at the pickup station 10 (FIGS. 6 and 9), transport the matter to the stuffing station 11 and thereafter transfer the matter to the stacker mechanism 12. Immediately following the transference of the stuffed envelope to the stacking mechanism 12, the operation of the feeding and stuffing mechanism, generally indicated at 116 (FIGS. 5, 6 and 9), is terminated, i.e., a single cycle of operation of clutch 24 is completed.

It will be recalled that upon engagement of clutch 24 and with each revolution of toothed pulley 70 (FIGS. 2 and 5) secured to the driven side of the clutch, shaft 80 is driven for two complete revolutions. Adjacent its one end, shaft 80 is journalled in a bushing secured on side frame 15 and, at its other end, is suitably journalled in the web extension of a channel member 117 mounted on side frame 16, which also supports a plate 118, secured adjacent the inner surface of the frame member 16 by any suitable means, such as screws 115. Channel member 117 is supported on side frame member 16 in spaced parallel relationship to plate 118 by means of bolts 121 and spacers 122 (FIGS. 5 and 6). The respective flanges 119 and 120 of channel member 117 project inwardly and lie in a plane parallel to base member 14.

A pair of similar toothed pulleys 123 (FIG. 5) are carried by shaft 80, one secured on the shaft adjacent side frame member 15 and the other secured on the shaft adjacent one extended end portion of the web of channel member 117. The diameter of each of the toothed pulleys 123 is such that a pair of similar timing belts 124, one passing over each of the pulleys, will be moved one-half their respective lengths with each two revolutions of the shaft 80. Each of a pair of similar toothed pulleys 125, identical to pulleys 123, carries respective belts 124. One of the toothed pulleys 125 is rotatably mounted on a pin 126 (FIGS. 6 and 7) secured on the extended end portion of the web of channel member 117 opposite the end portion in which the shaft 80 is journalled, the shaft journal and pin 126 being located on the horizontal center line of the channel 117. The other toothed pulley 125 is rotatably mounted on a pin 127 (FIGS. 7 and 9) secured on side frame member 15 in axial alignment with pin 126, the axial alignment of the pins 126 and 127 being parallel to the axis of shaft 80. Any possible sag in the upper run of the respective timing belts 124 is precluded by the passage of the upper run of one belt along the top surface of the flange 119 of channel member 117 and the passage of the upper run of the other belt along the top surface of the horizontally disposed leg of a right angle member 128 secured on side frame member 15.

Upon each cycle of machine operation and the two complete rotations of shaft 80, the timing belts 124 serve jointly to move alternate sets of three feed fingers 132 and 133 (FIGS. 5, 6, 7 and 9) through a series of operations including the pickup and feeding of an insert, opening an envelope, stuffing the insert therein and removing the stuffed envelope from a stack of envelopes, to be followed by a stacking operation. For this purpose, each of the timing belts 124 is provided with protuberances 134 and 135 formed on the outer surface of the belt and equally spaced along its length. The protuberance 134 on each of the belts 124 provides a bearing journal for the respective round end portions of a square shaft 136, which supports one set of feed fingers 132 for axial adjustment thereon. Similarly, the protuberance 135 on each of belts 124 provides a bearing journal for the respective round end portions of the square shaft 137, which supports the axially adjustable feed fingers 133.

In the normal full-cycle position of the clutch 24, the square shaft 136, which is disposed axially parallel to the aligned axis of the pins 126 and 127 supporting the respective pulleys 125, is positioned at the top of the pulleys 125 at substantially the point of tangency of the upper run of belt 124 with the pulleys. At the same time, square shaft 137, disposed axially parallel to shaft 80, is at rest at the bottom of pulleys 123 and at substantially the point of tangency of the lower run of the belt with the pulleys. Inasmuch as the belts 124 move one-half their length with each cycle of machine operation, the relative positions of the shafts 136 and 137 is reversed from that shown in FIGS. 6 and 9, so that shaft 137 assumes the position of shaft 136, while shaft 136 is moved to the position of shaft 137 in alternate cycles of machine operation.

Inasmuch as the construction of the feed fingers 132 and 133 carried by the respective shafts 136 and 137 is identical, it is believed that a description of one will suffice for all. Referring now to FIGS. 5, 7, 12, 13 and 14, the feed finger 132 is provided with a web 140, having a pair of parallel flanges 141 and 142 of identical configuration formed at a right angle thereto. The distended end portion of each of flanges 141 and 142 is provided with a similarly dimensioned square aperture, which apertures are aligned and are of a size sufficient to enable axially sliding movement of the finger 132 on shaft 136. It is readily apparent that the support of the finger 132 in this manner on shaft 136, enables any rocking movement of the shaft 136 to be imparted to the finger 132, as will be described hereinafter.

Each of the square shafts 136 and 137 is provided with a plurality of triangular-shaped notches 143, formed in the shaft in equally spaced relationship along one corner edge thereof, representative of the various positions to which the fingers 132 may be selectively adjusted. To control such an adjustment, a latching bail 144 is rockably mounted upon a shaft 145 secured at its respective ends in flanges 141 and 142. The arms 146 and 147 of bail 144 lie adjacent the inner surface of the respective flanges 141 and 142 and in the latching position of the bail, the web portion 148 thereof lies in a plane parallel to the lower surface of the web 140 of finger 132, as seen in full line in FIGS. 13 and 14. Arm 147 of bail 144 extends downwardly and at an angle consistent with the angle of the bottom of the notches 143 in the shaft 136. Normally, the extension of the arm 147 is urged into engagement with a selected one of the notches 143 by means of a spring 149 engaged at its one end on a pin 150 on flange 142 and, at its other end, on a pin 151 on the lower extended portion of the arm 147.

In order to enable the adjustment of the feed finger 132 from one position to another along shaft 136, bail 144 is rocked counter-clockwise to the position shown in phantom line in FIG. 13, wherein the lower end of the extended arm 147 is removed from its engagement with the corresponding notch 143 in shaft 136. For this purpose, and in the embodiment shown, a pad 152, preferably of thermoplastic material, is secured on the top surface of the web portion 148 of bail 144, extending upwardly through a suitable aperture in the web 140 of the feed finger 132, where it may be easily manipulated by finger pressure.

Immediately upon initiation of a machine operation, the initial movement of the belts 124 serves to move either shaft 136 and the feed fingers 132, carried thereby, or the shaft 137 and the associated feed fingers 133 beneath the pickup station 10. Upon passing beneath the pickup station 10, an insert becomes cradled on the web 140 of either the fingers 132 or fingers 133 to be conveyed toward the other end of the machine. Each of the feed fingers 132 of the one series of fingers and the feed fingers 133 of the other series of fingers is provided with adjustable means which become operable to pick up the insert as the one or the other series of fingers passes the pickup station. The adjustability of the pickup means is for the purpose of enabling either the feed fingers 132 or feed fingers 133 to adequately support each insert, which may be a letter, card or other mail matter of varying widths.

In order to effect the pickup operation, a fork-like member 158 (FIGS. 12, 13 and 14) is secured by any suitable means, such as rivets 159, on the lower surface of a rectangular plate 160, slidably mounted for horizontal movement lengthwise of the finger 132 by the engagement of the respective ends of the plate in suitable slots 161 and 162 of respective flanges 141 and 142. In the embodiment shown, the fork-like member 158 is of a resilient material, preferably berryllium, and the offset end portion of each prong 163 and 164 of the member 158 is circular in shape and is extruded slightly to form a node 165. As the plate 160 is moved longitudinally of the feed finger, the nodes 165 are adapted to resiliently engage in corresponding dimples 166 of the respective rows of equally spaced dimples formed in the lower surface of the web portion 140 of the finger 132. Thus, the plate 160 is selectively maintained in each of a plurality of adjusted positions.

As the plate 160 is adjusted, a laterally projecting tongue 167 of the fork-like member 158, extending upwardly through an elongated slot 168 in the web portion 140 intermediate flanges 141 and 142, is likewise adjusted relative to the free end of the feed finger 132. The upper end portion 169 of the vertically disposed tongue 167 extends laterally toward the nose 153 of, and in a plane parallel to, the web 140 of finger 132 forming a hook 170. The opening of the book 170, i.e., the distance between the lateral extension 169 of tongue 167 and the top surface of the web 140 of finger 132, is such that as the fingers 132 or 133 move into pickup position, the lateral extension 169 will be above a series of horizontally disposed insert-supporting bars 174 sufficiently to pick up the insert resting thereon.

In order to effect an adjustment of the hook 170 relative to the nose 153 of the finger 132 and in accordance with the width of the insert, the ends of the plate 160 extend beyond the respective flanges 141 and 142 and the edges have a concave form to enable the grasping of the plate between the thumb and forefinger. The plate 160 and prongs 163 and 164 of the forklike member 158 are guided in their movement along the web 140 by a rectangular plate 175 secured on the plate 160, by means of the rivets 159, for sliding movement within the slot 168. Following the adjustment of the hook 170 for an insert of a particular width and as the feed fingers 132 or 133 pass through the pickup station 10, the insert is cradled between the vertical extension 167 of the hook and the angularly upwardly formed nose 153 of the web 140. Thus, the nose 153, tapered in thickness to a rounded edge, extends beyond the insert and serves to effect an opening of an envelope in the stuffing station 11, as will be described hereinafter.

Referring to FIGS. 1, 6, 7 and 9, the endwise confines of the pickup station 10, wherein the inserts are placed to be picked up by either the series of fingers 132 or 133, are made adjustable to accommodate inserts of various lengths and to effect an accurate alignment of the inserts with the envelopes into which they are to be stuffed. Each insert is supported on the horizontally disposed bars 174 for the pickup and feeding operation, the supporting bars 174 being extensions of the webs of corresponding channels 176 formed in a plate 177 secured on the lower surface of the cover 92. The two intermediate channels are wider than the two outside channels, and are spaced apart sufficiently to permit the passage of the hook 170 of the middle feed finger 132 or 133 to pass therebetween. On the other hand, the spacing between each intermediate channel 176 and the adjacent outside channel is sufficient to enable a selective adjustment of the corresponding outside feed fingers 132 or 133 along shaft 136 or 137, respectively. It will be recalled that, as either fingers 132 or 133 move into the pickup station 10, the lateral projection 169 of the hook 170, associated with each of the fingers, moves over the top of the rearward, or trailing, edge of the insert to prevent displacement of the insert with respect to the hook members 170 of the active fingers during the conveyance of the insert to the stuffing station 11.

In order to effect proper alignment of the insert, irrespective of its length, with an envelope of a corresponding length, a pair of guides 180 and 181 are provided and are adjustable equally, toward and away from each other, by manipulation of a knob 182 (FIG. 9). Knob 182 is secured on the upper end of a vertically disposed shaft 183 suitably supported for rotation in cover plate 184 and the top machine cover 92. At its lower end, shaft 183 carries a collar 185 secured thereon adjacent the lower surface of the cover 92. A gear 186 is also secured on shaft 183 and is positioned adjacent the top surface of cover 92, thereby precluding axial movement of the shaft 183 within the covers 92 and 184.

Guide 180 (FIG. 1) is formed on a laterally extended offset end of a flange 190 formed on the projected end 191 of a rack slide 192 mounted for reciprocable sliding movement on the top of cover 92. Rack slide 192 is guided in its sliding movement in the rotational plane of gear 186 by the engagement of a pin 193 on cover 92 in an elongated slot 194 in the slide extending parallel to rack teeth 195. Also, by the engagement of a pin 196 carried on the projected end 191 of slide 192, in an elongated slot 197 in cover 92 extending parallel to slot 194 in the slide. Similarly, guide 181 is formed on the laterally extended offset end of a flange 200 formed on the projected end 201 of a rack slide 202 slidably mounted on top cover 92 for movement in the rotational plane of gear 186 and in a direction opposed to that of rack slide 192. Rack slide 202 is guided in its reciprocable movement in a manner similar to that of rack slide 192 by the engagement of a pin 203 on machine cover 92 in an elongated slot 204 in the slide extending parallel to the plane of the rack teeth 205. Also, by the engagement of a pin 206 carried on the projected end portion 201 of slide 202, in an elongated slot 207 in cover 92 extending parallel to slot 204 in the slide.

Referring to FIG. 1, a pinion 208, rotatable on a pin 209 secured on machine cover 92, is enmeshed with gear 186 and rack teeth 205 of slide 202, so that a counter-clockwise rotation of the shaft 183 and, therefore, gear 186, by manipulation of knob 182, will move guide 181 upwardly. At the same time, a pinion 210, similar to pinion 208, is rotatable on a pin 211 secured on the machine cover 92 and is enmeshed with both gear 186, in diametral opposition to pinion 208, and with the rack teeth 195 of slide 192. Thus, the counter-clockwise rotation of gear 186 moves guide 180 downwardly an extent equal to the movement of guide 181. In this manner, the guides 180 and 181 may be selectively moved inwardly toward each other from the full line position shown in FIG. 1 to the position indicated by phantom line, defining the lengthwise limits of an insert, such as a card. Conversely, a clockwise rotation of shaft 183 and gear 186 will serve to move the guides 180 and 181 concomitantly from the phantom line position to the full line position in FIG. 1, thereby enabling the positioning of an insert I, such as a letter, on the supporting bars 174. Guides 180 and 181 are resiliently retained in each position to which they may be moved relative to each other, as determined by the angular rotation of gear 186, by the engagment of a tooth on a detent lever 215 between the teeth of gear 186. Lever 215 is pivotally mounted on a pin 216 secured on machine cover 92 and is normally urged in a clockwise direction by means of a spring 217 to resiliently maintain the tooth of the lever 215 in engagement between teeth of the gear 186. A suitable slot is provided in the angularly-formed face of the cover 184 (FIG. 6) to enable a freedom of movement of the guides 180 and 181 during the adjustment thereof.

As an insert I, such as a letter indicated by phantom line in FIG. 1, is positioned on the supporting bars 174 between guides 180 and 181, switch actuating bellcrank 95 is rocked to the position indicated by phantom line in FIG. 9 to effect a closure of switch 112. Thereupon, solenoid 74 (FIG. 2) is energized to effect engagement of the clutch 24 for a cycle of machine operation. To enable the rocking of bellcrank 95, the vertical extension 110 of the horizontally disposed arm 109 of the bellcrank, projects upwardly through a suitable notch 218 in one of the intermediate supporting plates 174. Normally, the top surface 111 of the lateral projection of the extension 110 is positioned above, and in a plane parallel to, the supporting plate 174. It will be recalled that the placement of the insert I in the pickup position in contact with the flat surface 111 is sufficient to rock bellcrank 95, irrespective of the weight of the insert, the sensitivity of the bellcrank being determined by the adjustment of the slide 106 (FIG. 9) and the positioning of the metallic plates 104 relative to permanent magnet 98.

Upon initiation of a cycle of machine operation, either the feed fingers 132 or feed fingers 133 move into position immediately to pick up the insert I and move it forwardly to the stuffing station 11 (FIG. 1), wherein a stack of envelopes E are disposed with flaps spread and the opening of the lowermost envelope in the path of movement of the insert. The stack of envelopes of a size suitable to receive the inserts to be stuffed thereinto is positioned in a hopper defined by the respective corner guides 222, 223 and 224, 225 and by the aligned frontal edge of the projections 226 along the lower edge of an inclined shield 227 secured on the top cover 92. In order to enable the stuffing of the insert I into the envelope E, the stack of envelopes is placed face up within the hopper with the lowermost envelope resting upon the end portion of resilient strips 228 (FIGS. 1, 6, 9 and 16), which are secured on, and form lengthwise extensions of, respective supporting bars 174. In the embodiment shown, the strips 228 are preferably of beryllium and are formed angularly upward from the end of respective supporting bars 174 with the top surface of each strip 228, adjacent the end thereof, in contact with the lower surface of the end of the corresponding projection 226 of shield 227. At its ends, the lowermost envelope rests upon arcuate ears 229 and 230 formed angularly downward from the lower edge of respective corner guides 222 and 224. Intermediate its ends, the lowermost envelope is also removably supported along its lengthwise closed edge on the tufted bristles 231 (FIGS. 15 and 16) secured in a block 232 mounted on the lower surface of a plate 233 of the adjustable guide carriage 221.

Referring to FIGS. 1, 9, 15 and 16, the corner brackets 222, 223 and 224, 225 are adjustable transversely of the machine and relative to each other to provide support for a stack of envelopes of any given length. Likewise, carriage 221 may be adjusted lengthwise of the machine to enable the corner brackets 222, 223 and 224, 225, as well as tufted bristles 231, to provide adequate support for envelopes of any given width. For this purpose, guide 222 is formed on the extended end of a flange 238 formed at a right angle to the laterally extended end 239 of a rack slide 240 mounted for sliding movement on plate 233. To guide the slide 240 in its movement, a pin 241 on the extension 239 of the slide is engaged in an elongated slot 242 in plate 233, and a pin 243 secured on plate 233 is engaged in an elongated slot 244 in the slide 240. The slots 242 and 244 are parallel to each other and to the plane of rack teeth 245 of the slide 240. Guide 223 is secured on flange 238 by rivets 246 (FIG. 6), or other suitable means, in a right-angular relationship to guide 222, thereby forming corner guide 222, 223. Similarly to guide 222, guide 224 is carried by an extension of a flange 248 formed at a right angle to the laterally extended end 249 of a rack slide 250 mounted for sliding movement on plate 233. Guides for the slide 250 are provided by the engagement of a pin 251 on plate 233 in an elongated slot 252 in the slide 250 disposed parallel to the plane of the rack teeth 253 and by the engagement of a pin 254 carried by the extended end 249 of the slide with an elongated slot 255 in plate 233 extending parallel to slot 252. Guide 225 is secured on flange 248 in a right-angular relationship to guide 224, by any suitable means, such as rivets 246, thereby forming corner guide 224, 225.

Corner guides 222, 223 and 224, 225 (FIGS. 1, 9, 15 and 16) are respectively moved by equal increments in opposite directions relative to each other to properly adjust guides 222 and 224 to the length of the envelopes to be used. For this purpose, a knob 260 is secured on the upper end of a shaft 261 which extends through a suitable aperture in cover 262 and is journalled adjacent its lower end in plate 233. Axial movement of shaft 261 is precluded by means of a collar 263 secured on the lower end of the shaft adjacent the lower surface of plate 233, and by a pinion 264 secured on the shaft 261 adjacent the top surface of plate 233. A relative adjustment of the corner guides 222, 223 and 224, 225 is under the control of a clockwise, or counter-clockwise, rotation of knob 260 and, therefore, shaft 261 (FIGS. 1 and 15) which serves respectively to move guides 222 and 224 outwardly to the position indicated in full line or inwardly to the position indicated by phantom line (FIG. 1). Upon such manipulation of the knob 260, the lateral adjustment of the slide 250 is controlled by means of a pinion 265, rotatably mounted on a pin 266 secured on plate 233 and enmeshed with pinion 264 and rack teeth 253. Similarly, a pinion 267 is rotatably mounted upon a pin 268 on plate 233 and is enmeshed with pinion 264 in diametral opposition to pinion 265. Pinion 267 is also enmeshed with the rack teeth 245 of slide 240 and serves to control lateral adjustment of the slide 240 relative to the adjustment of slide 250. It, therefore, becomes apparent that a counter-clockwise rotation of shaft 261 and pinion 264 will move guides 222 and 224 equally inward from the position shown in FIG. 15 and in full line in FIG. 1. Each of corner guides 222, 223 and 224, 225 is resiliently retained in each position determined by the angular rotation of the pinion 264 by means of a detent pawl 269 pivotally mounted on a pin 270 secured on plate 233. Normally, a toothed projection on pawl 269 is urged into a position between adjacent teeth of pinion 264 by a spring 271.

In addition to the lateral adjustment of corner guides 222, 223 and 224, 225, the guides may be moved lengthwise of the machine to accommodate envelopes of various widths by the adjustment of the carriage 221 (FIGS. 1, 6, 9 and 15). To enable the adjustment of the carriage 221, plate 233 is slidably supported at each end on a pair of similar bushings 274 resting on top cover 92. The bushings 274 are maintained in place on cover 92 by each pair of similar shoulder screws 275 engaged in respective elongated slots 276 and 277 disposed in parallel relationship in plate 233, the screws 275 extending through the bore of bushings 274 for threaded engagement in cover 92.

In order to effect the adjustment of the carriage 221 (FIGS. 1, 9, 15 and 16), a vertically disposed shaft 278 extends upwardly through a suitable aperture in the cover 262 and at its upper end carries a knob 279 secured thereon. At its lower end, shaft 278 extends through plate 233 and axial movement of the shaft is precluded by each of similar pinions 280 and 281 secured thereon in positions adjacent respective upper and lower surfaces of the plate 233. Manipulation of knob 279 controls the movement or adjustment of carriage 221 on machine cover 92 by the rotation of pinion 281 enmeshed with rack teeth 282 provided on the lengthwise laterally offset portion of a bracket 283 secured on machine cover 92. Thus, it becomes apparent that upon clockwise rotation of knob 279 and, therefore, shaft 278, the carriage 221 will move upwardly from the position shown in FIG. 15 to any desired position, the extent of its movement being limited by the length of respective slots 276 and 277 in plate 233. Conversely, a counter-clockwise rotation of knob 279 will become effective to return the carriage to the position shown in FIG. 15. The adjustment of the carriage 221, as determined by the angular rotation of pinion 281 in either direction, is resiliently maintained by a detent pawl 284 pivotally mounted on a pin 285 secured on plate 233. A tooth on detent pawl 284 is normally urged into engagement between adjacent teeth of pinion 280 by means of a light spring 286.

It will be noted that carriage cover 262 is supported upon a flange 287 (FIGS. 9 and 15) formed at a right angle to one end of plate 233 and on each of flanges 288 and 289 (FIGS. 6 and 15) formed at a right angle on the opposite end of the plate 233, and the cover is retained in place thereon by means of the control knobs 260 and 279. Along its top edge (FIG. 15) the carriage cover 262 is provided with a suitable opening within which the respective corner guides 222, 223 and 224, 225 move during the lateral adjustment thereof.

Prior to the placement of a stack of envelopes E into the hopper, or stuffing station, 11, the carriage 221 is adjusted to a position such that the flap edge of the lowermost envelope, as indicated in phantom line in FIG. 1, rests upon the end portion of the resilient strips 228 with the flap open and supported on the top surface of shield 227. Following the positioning of the stack of envelopes E in the hopper 11, a weighted member 295 (FIGS. 9, 15 and 16) is placed on top of the stack to ensure downward movement of the stack as each lowermost envelope is removed therefrom. At the same time, a substantially triangular plate 296, having a hinged connection with weighted member 295, conforms to the incline of shield 227 resting upon the flaps of the envelopes. The weighted member 295 and the plate 296, hinged thereon, may be raised by means of knob 297 to enable the positioning of the stack of envelopes in the hopper 11. For this purpose, each of a pair of right-angle brackets 298 is secured on the respective ends of the weighted member 295 and is pivotally connected at 299 to one end of one of arms 300, the other end of which is pivotally mounted at 301 on the end walls of shield 227.

It will be recalled that the hook member 170, associated with each finger of the series of fingers 132 and 133, is adjusted for the inserts or mail matter to be handled, so that the angular upwardly formed nose 153 of the fingers projects beyond the insert I (FIGS. 17 and 18), following the passage of the fingers 132 or 133 through the pickup station 10. As the insert I is advanced to the right during a machine operation, as viewed in FIGS. 6, 17 and 18, by either feed fingers 132 or 133, it is maintained in contact with the surface of supporting bars 174 by a series of bristle tufts 305. One such tuft 305 is secured on one angular lower surface of each triangularly-formed guide block 306 which is secured on the underside of shield 227 in a position overlying a corresponding support bar 174 (FIGS. 6, 8, 17 and 18). The other angular lower surface 307 of each triangularly-formed guide block 306 lies in a plane directed toward the point of contact of the associated resilient strip 228 with the edge of the corresponding projection 226 (see FIG. 1). Thus, a tapered passageway is formed through which the insert I is directed for entry into the open mouth of the lowermost envelope E in the stack of envelopes (FIGS. 17 and 18). Each of the guide blocks 306 may be constructed of any suitable material, but is preferably formed of a thermoplastic material in the embodiment shown. As the insert I enters the passageway formed by the lower surface 307 of each of the guide blocks 306 and the corresponding strip 228, the active feed fingers 132 or 133 are rocked angularly upward to move the insert therethrough. As the active feed fingers continue to advance, the tapered angularly formed noses 153 thereof enter the mouth of the lowermost envelope E and, upon further movement, open the envelope sufficiently to permit the entry of the insert therein. In order to ensure sufficient penetration of the active feed fingers 132 or 133 within the envelope to complete the stuffing operation, the forward end of each of the respective flanges 141 and 142 of each feed finger is chamfered, as at 308, to increase the width of the envelope opening.

Immediately upon completion of the stuffing operation, the active fingers 132 or 133 are restored momentarily to a horizontal plane, parallel to the plane of supporting bars 174, and thereby remove the stuffed envelope E from the stack of envelopes in the hopper 11. As the forward end, or noses 153, of the active fingers 132 or 133 are rocked downwardly into a horizontal plane, the tufted bristles 231 yield as the right-hand edge of the stuffed envelope E, as viewed in FIG. 18, is removed from engagement therewith. At the same time, the envelope is moved out of engagement with the supporting ears 229 and 230 of the respective corner guides 222, 223 and 224, 225. Immediately thereafter, the active feed fingers 132 or 133 continue their advancement as the fingers continue to be rocked angularly downward for conveyance of the stuffed envelope E to the stacking mechanism 12.

In order to control the rocking movement of the feed fingers 132 and 133 (FIGS. 6, 7, 17, 18, 19 and 20) during each cycle of machine operation, each of the square shafts 136 and 137, which support the respective series of feed fingers 132 and 133, also supports one end of an arm 312 and 313, respectively, secured thereon. It will be recalled that shafts 136 and 137 are suitably journalled in the axially aligned protuberances 134 and the axially aligned protuberances 135, respectively, on belts 124. Each of arms 312 and 313 is secured on the extended end of respective shafts 136 and 137 and carry a roller 314 and 315, respectively, engaged in a continuous cam groove 316 formed in the surface of the plate 118 secured on side frame member 16.

Upon initiation of a machine cycle of operation, the upper run of the belts 124 move to the right (FIG. 6) to carry the shaft 136 and feed fingers 132 to the position assumed by the shaft 137 and feed fingers 133 and vice versa. As the shaft 136 is moved from its position in FIGS. 6 and 17, the roller 314 on arm 312 moves along the horizontally disposed path of the cam groove, or track, 316. As the insert I enters the passageway formed between the lower surface 307 of the guide blocks 306 and the resilient strips 228, the roller 314 moves up the angularly disposed portion 317 of the groove 316, thereby enabling the noses 153 of the corresponding feed fingers 132 to enter the mouth of the lowermost envelope E in the stack of envelopes (FIG. 18). Immediately thereafter, the roller 314 moves along the upper horizontal plane of the groove 316 for the stuffing of the insert I in the envelope E. Assuming the envelopes E in the stack are of the larger of the two sizes indicated in phantom line in FIG. 1, the roller 314 (FIGS. 17 and 18) will be held suspended in the enlarged opening 322 in cam track 316 by means of the lowermost envelope E as the stuffing operation nears its completion. As the stuffing operation is completed, the roller 314 contacts inclination 318 in the cam groove, as well as the inclined surface 319 of a V-shaped nose 320 of a depending arm 321. Arm 321 is at a right angle to the right-hand end of plate 233 in the shiftable carriage 221 (FIG. 15) and is adapted to move within a slot 323 in the cover 92 upon adjustment of the carriage 221. If the carriage 221 is moved to the left to accommodate the smaller size envelope indicated in phanton line in FIG. 1, the depending arm 321 on the plate 233 of the carriage will be in a position such that roller 314 will immediately contact the inclinded surface 319 of the V-nose 320, upon movement of the roller into the opening 322 of the cam groove 316 as the stuffing of the smaller envelope is completed.

Upon engagement of roller 314 with the inclination 318 in the cam groove 316 and the inclined surface 319 of the arm 321, following the stuffing of the larger envelope or, upon engagement with the inclined surface 319 alone, following the stuffing of a smaller envelope, the feed fingers 132 will be rocked clockwise to remove the stuffed envelope from the stack. It will be understood that the removal of a stuffed envelope of any given width from a stack of envelopes of similar width will be effected immediately upon completion of the stuffing operation, as determined by the adjustment of the carriage 221 and the position of the inclined surface 319 of arm 321 relative to the opening 322 in cam groove 316.

Upon continued progression of the belts 124, roller 314 moves along the reverse curvilinear portion 324 of cam track 316 to a position near the end thereof for the transfer of the stuffed envelope to the stacking mechanism 12, as will be hereinafter described. The belts 124 continue to move until the cycle of machine operation is terminated, when the series of feed fingers 132 assume the position of the series of feed fingers 133, as indicated in phantom line in FIG. 6. At the same time, the feed fingers 133 will be moved to the left to assume the position indicated by feed fingers 132.

In order to enable a reverse direction of movement of the active feed fingers 132 to a full-cycle position thereof as the belts 124 pass over toothed pulleys 123, roller 314 moves angularly downward in portion 325 of the groove 316 to the position occupied by roller 315 (FIG. 6). Upon movement of roller 314 into its terminal position in the curvilinear portion 324 of the groove 316, it comes into contact with an arm 330 pivotally mounted at 331 on plate 118. Arm 330 lies adjacent the face of plate 118 and is normally urged counter-clockwise to the position shown in FIG. 6 by means of a spring 332. The spring 332 is positioned on the outside of frame member 16 and is supported at its upper end on a pin 333 secured on the frame member 16 and, at its lower end, is supported on a pin 334 carried by arm 330 and extending through an arcuate slot 335 provided in plate 118 and frame member 16. The normal position of the arm 330 is determined by the engagement of pin 334 thereon with the upper end of the slot 335. At its free end, the arm 330 is bevelled in a manner such that the chamfer 336 coincides with the top surface 337 of the angular portion 325 of cam groove 316. Thus, it becomes apparent that as roller 314 moves in its path toward the terminal position in the curvilinear portion 324 of the groove 316, arm 330 is rocked clockwise. Upon passage of the roller beyond the end of the arm 330, the arm 330 is restored to its normal position shown in FIG. 6, so that the chamfer 336 provides a cam surface effective to direct roller 314 into the angular portion 325 of the groove.

During this cycle of machine operation in which the series of feed fingers 132 have been active, the roller 315, carried by arm 313 which controls the rocking movement of the inactive feed fingers 133, moves angular downward in the lower path 38 of the cam groove 316 (FIG. 6), rocking the nose of the feed fingers 133 clockwise to provide sufficient clearance as the feed fingers pass beneath shaft 80. As the lower run of the belts 124 continue in their movement to the left (FIG. 6), roller 315 moves upwardly in the lower path 338 of the cam groove 316 to a terminal position in the area, indicated at 339, in the groove. From this point, the roller 315 continues its movement angularly upwardly in the opposite direction to come to rest in the full-cycle position indicated by roller 314 on arm 312 associated with the feed fingers 132. The reversal in the direction of movement of the roller 315 from the terminal left end position 339 (FIG. 6) is controlled in a manner similar to that described in connection with roller 314 in the terminal right end position. An arm 342 is pivotally mounted at 343 on the face of the plate 118 adjacent the surface of the plate and at its upper end is provided with a lateral extension which carries a pin 344 secured thereon. Pin 344 extends through similar corresponding arcuate slots 345 in plate 118 and frame member 16 and, at its outer end, supports one end of a spring 346, the other end of which is supported on a pin secured on frame member 16. Spring 346 normally serves to resiliently retain arm 342 in the position shown in FIG. 6, wherein pin 344 is in engagement with the upper end of the arcuate slot 345. However, as roller 315 moves upwardly in the lower path 338 of the groove 316 toward the terminal left-hand position 339, it contacts the leading edge of the arm 342, rocking the arm counter-clockwise to permit passage of the roller therebeyond. Immediately upon movement of the roller 315 beyond the end of the arm 342, spring 346 becomes effective to restore the arm 342 to the normal position shown. The end surface of the arm 342 then becomes effective to direct roller 315 upwardly to the full-cycle position, indicated by roller 314, when the cycle of machine operation is terminated.

In order to terminate the operation, a disengagement of the main drive clutch 24 is effected, following each machine cycle of operation, i.e., the active operation of one or the other of the series of feed fingers 132 or 133. It will be recalled that, as an insert is placed on the supporting bars 174 of the pickup station 10, its weight becomes effective to rock bellcrank 95 (FIG. 9) from the position shown in full line to that shown in phantom line, wherein the permanent magnet 98 effects closure of Micro-Switch 90, thereby energizing solenoid 74 (FIG. 2) to effect engagement of the main drive clutch 24 (FIG. 3). As the main drive clutch 24 nears the completion of a single cycle of rotation and as either square shaft 136 or 137 moves to the position of the shaft 136 shown in FIG. 9, a collar 347 (FIG. 7), secured on each of shafts 136 and 137, engages the lower edge of the arm 109 of bellcrank 95 to rock the bellcrank clockwise to its normally inactive position. Thus, Micro-Switch 90 is opened, resulting in the de-energization of solenoid 74 to enable clutch pawl 66 to rock to its clutch-disengaging position, terminating the machine operation.

Referring to FIGS. 9, 19, 20, 21 and 22, as either roller 314 on arm 312 controlling the rocking movement of the series of feed fingers 132 or roller 315 carried by arm 313 for controlling the rocking movement of the series of feed fingers 133 moves into the right-hand terminal position adjacent the lower end of the curvilinear portion 324 of cam groove 316, the leading, or closed, edge of the stuffed envelope E is moved into the bite or grasp of each of a pair of grippers 350 and 351, or 352 and 353 of the stacking mechanism 12. Each of the grippers 350, 351, 352 and 353 is identical in construction so it is believed that a description of the grippers 350 will suffice for all. Each of the grippers 350 and 352 is pivotally mounted on respective pins 354 and 355 secured on equal radii and in diametrically opposed relationship on a blade 356. Similarly, grippers 351 and 353 (FIG. 9) are pivotally mounted on respective pins 357 and 358 secured on equal radii and in diametrically opposed relationship on a blade 359. The blades 356 and 359 are secured on a shaft 360 in spaced relationship and intermediate the ends of the shaft (FIG. 5). At its respective ends, shaft 360 is suitably journalled in side frame member 15 and auxiliary frame member 361 and is also supported adjacent its one end in an auxiliary frame member 362. Each of the auxiliary frame members 361 and 362 is secured on base member 14 in parallel relationship to each other and in equally spaced relationship to the respective adjacent blades 356 and 359. Each of the auxiliary frame members 361 and 362 is maintained perpendicular to base 14 and parallel to respective frame members 16 and 15 by means of spacer studs 363 and 364 secured, respectively, on frame members 16 and 15. Shaft 360 is axially parallel to drive shaft 80 and each of the plates 356 and 359 is equally distant from a center line running lengthwise of the machine midway between the pairs of toothed pulleys 123 and 125.

Although a description of only gripper 350 will be given, the corresponding parts of each of the grippers 351, 352 and 353 will carry the same reference numeral with the addition of the letters "a," "b" and "c," respectively. At its one end, the lower arm, or jaw, 370 of the gripper 350 is U-shaped in form to provide a pivotal mounting for the arm on pin 354. At its other end, jaw 370 is extended and is substantially triangular in shape with the vertex 371 of the top angle meeting with the vertex 372 of the lower angle of the substantially triangularly-shaped extension of the upper jaw 373 of gripper 350. At its other end jaw 373 is laterally offset and is embraced in the U-shaped end portion of jaw 370 for pivotal support on pin 354. The vertices 371 and 372 of the triangularly-shaped end portions of respective jaws 370 and 373 are normally resiliently retained in contact, one with the other, by means of a relatively strong spring 374 to form the bite of the gripper 350, spring 374 being supported at its respective ends on pins 375 and 376 on respective jaws 370 and 373. In the normal full-cycle position of the blade 356 shown in FIG. 19, a center line passing through the center of pin 354 and the bite of gripper 350 lies in a horizontal plane and is parallel to a similar center line passing through pin 355 and the bite of the gripper 352. This parallel relationship is normally maintained by means of a spring 377 secured at its one end on a pin 378 on blade 356 and at its other end on a pin 379 carried by a laterally projecting ear 380 of jaw 370, urging the gripper 350 clockwise to engage the ear 380 with a pin 381 on blade 356. Likewise, spring 377–b serves to resiliently maintain ear 380–b of jaw 370–b in engagement with a pin on blade 356, similar to pin 371. Each of the blades 356 and 359 is angularly positioned on shaft 360 in a manner such that pins 354 and 357 (FIGS. 9 and 19), pivotally supporting grippers 350 and 351, respectively, are axially aligned as are pins 355 and 358, pivotally supporting grippers 352 and 353, respectively.

Immediately following the seizure of the envelope E and its insert by the jaws 370 and 373 of the gripper 350, as seen in FIGS. 19 and 20, and by the jaws 370–a and 373–a of the corresponding gripper 351 (FIG. 9), shaft 136 and the feed fingers 132 supported thereon continue their downward movement as the belts 124 pass over the pulleys 123. Whereupon, the roller 314 on the arm 312 secured on shaft 136 enters the angular downwardly extended portion 325 of the cam groove 316. As the shaft 136 moves into the full-cycle position shown in FIG. 20, the fingers 132 associated therewith are rocked counter-clockwise as they are partially withdrawn from the stuffed envelope E, the insert being retained in place by the grasp of the grippers 350 and 351. The envelope E and its insert remain in this position (FIG. 20) until the next succeeding cycle of machine operation, whereupon feed fingers 133 become active to control the next stuffing operation.

Upon initiation of the next succeeding cycle of machine operation and after approximately 52° of angular rotation of the clutch 24 and drive pulley 70, an angular rotation of 180° is imparted to the blades 356 and 359. It is during this 180° rotation of the blades 356 and 359 that the stuffed envelope of the preceding machine cycle of operation is transferred to the stacking plate 385, as seen in FIGS. 21 and 22, after which the blades 356 and 359 continue rotation to the full-cycle position shown in FIG. 22. At this time, the positions of the grippers 350 and 352 are the reverse of that shown in FIG. 19. The 180° angular rotation of the blades 356 and 359 is under the control of the Geneva system 85 (FIG. 2). It will be recalled that upon each cycle of operation of the main drive clutch 24, toothed drive pulley 70 imparts two complete revolutions to shaft 80 and toothed pulleys 123 to move feed fingers 132 from the position shown in FIGS. 5 and 9 to the position occupied by feed fingers 133 and vice versa. At the same time, toothed pulley 83 (FIG. 2), integral with pulley 70, will impart a one-half revolution or 180° rotation to the toothed pulley 84. Toothed pulley 84 is rotatably mounted on a shaft 386 suitably supported at its ends in side frame member 15 and auxiliary frame member 17 (FIGS. 2 and 5). With each 180° rotation of toothed pulley 84 an intermittent motion is imparted to a six-segment Geneva wheel 387. For this purpose, a Geneva block 388 is integrally formed on the toothed pulley 84 concentric therewith, having its diametrically opposed ends arcuately formed to co-operate with the concave surfaces 389 of the segments of the Geneva wheel 387. A pair of diametrically opposed rollers 390 are secured on equal radii on toothed pulley 84 positioned 90° from the lengthwise center line of Geneva bar 388 and adapted to engage in a corresponding slot 391 in Geneva wheel 387. Geneva wheel 387 is secured on a 90-toothed gear 392 concentric therewith and rotatably mounted upon a shaft 393 secured at its ends in side frame member 15 and auxiliary frame member 17. Thus, it can be seen that upon a one-half revolution of the toothed pulley 84, upper roller 390 (FIG. 2) will engage a corresponding slot 391 of the Geneva wheel 387, imparting a one-sixth revolution or 60° angular rotation to gear 392 enmeshed with 30-tooth gear 394 secured on the extended end of the shaft 360 which carries blades 356 and 359. Immediately thereafter the Geneva block 388 becomes effective to terminate rotation of the gear 392 which, during its 60° angular rotation, has imparted 180° rotation to gear 394 and, therefore, shaft 360.

Referring to FIGS. 21 and 22, during each 180° angular rotation of the blades 356 and 359, the envelope E and its insert, carried by either grippers 350 and 351 or 352 and 353, will be deposited on the stack table 385 in a stacked condition against adjustable stacking plate 13. Stack plate 385 is in the form of a cover secured on a base member 395 and, as a unit, detachably mounted or connected to the inserter. In order to removably secure the stack plate 385 and its base 395 in place on the inserting machine, a pair of mounting frame members 396 are provided extending longitudinally of the base 395, secured in a vertically disposed spaced parallel relationship thereon (FIGS. 5, 6 and 9). The spacing between frame members 396 is sufficient to enable the extended end 397 of each member 396 to be positioned adjacent the outer surface of each of auxiliary frame members 361 and 362. The extended end portion 397 of each frame member 396 has a slot 398 therein adapted for engagement with a corresponding pin 399 secured on respective auxiliary frame members 361 and 362. At its right end, as seen in FIG. 6, the machine cover 56 is provided with a suitable opening to accommodate the insertion of the end portions 397 of the respective frame members 396 thereinto, as well as the arcuately formed and extension 404 of the stack plate 385. A pair of parallel slots 405 are provided in the arcuate end portion of plate 385, having a spacing corresponding to the spacing between the blades 356 and 359 and extending into plate 385 sufficiently to enable the passage of the blades 356 and 359 therethrough.

During rotation of the blades 356 and 359, and as the respective grippers 350 and 351 or 352 and 353, carrying the envelope and its insert, pass through notches 405, the lower closed edge of the envelope engages the stacker plate 385, so that continued rotation of the blades 356 and 359 causes the envelope to be released from the grasp of the active grippers. Thereafter, the envelope falls against the stacker guard 13. As continued operation of the machine causes the stuffed envelopes to be deposited, one by one, on the stacker plate 385, the guard 13 is adjusted to accommodate the accumulation of stuffed envelopes. In order to effect an adjustment of the stacker guard 13 (FIGS. 21, 22 and 23) the right angularly-formed leg 406 thereof lies adjacent and is slidable on the plate 385 and is provided with a finger grip 407 which is preferably of a thermoplastic material. The finger grip 407 is secured in place by a shoulder screw 408 which is passed through an elongated slot 409 in the plate 385 and through a suitable aperture in the leg, or flange, 406 for threaded engagement in the finger grip 407. Shoulder screw 408 also serves to slidably maintain one laterally projecting ear of a substantially U-shaped frictional spring member 410 against a lower surface of plate 385. The other laterally projecting ear of the spring member 410 is maintained in frictional engagement with the lower surface of plate 385 by means of a screw 411 threaded into the finger grip 407, passing through slot 409 in plate 385 and through a suitable aperture in the web portion of the substantially U-shaped spring member 410. The spring 410 is maintained in place on the lower end of screw 411 by any suitable means, such as clip 412, and serves, in co-operation with screw 408, to maintain stacker guard 13 in a perpendicular and right angle relationship to slot 409 in plate 385. At its upper end, screw 411 is provided with an elongated knurled head 413 which serves to enable the screw 411 to be turned clockwise or counterclockwise, as viewed from the top, to increase or decrease the degree of frictional contact of spring 410 with the lower surface of the plate 385, as is necessary to retain the guard 13 in any adjusted position thereof.

What is claimed is:

1. In an envelope stuffing machine, the combination with a material supply station, an envelope supply hopper spaced from said material supply station in alignment therewith and having envelopes supported therein, an actuating means, material engaging members carried by said actuating means movable in a path below said material supply station and said envelope supply hopper and operative upon operation of said actuating means to pick up material at said supply station, to open the lowermost envelope in said supply hopper and insert the material thereinto and to remove the stuffed envelope from said supply hopper, a stacking means for gripping the stuffed envelope upon removal thereof from said supply hopper by said material engaging members and thereafter removing the stuffed envelope from the said engaging members, and an intermittently operable drive means for effecting operation of said actuating means and controlling operation of said stacking means.

2. In an envelope stuffing machine, the combination with a material supply station, a moving means including an intermittent drive means therefor, an envelope supply hopper spaced from said material supply station having opened flap envelopes supported therein with the envelope mouth toward said material supply station, material engaging members carried by said moving means movable in a path below said supply station and said supply hopper from an at-rest position to a discharge position upon each operation of said intermittent drive means, said material engaging members being operable upon movement from the at-rest position to the discharge position to pick up material in the said supply station, to convey the material to said supply hopper, to open the lowermost envelope in said supply hopper and insert the conveyed material thereto and to remove the stuffed envelope from said supply hopper, a stacking means including grippers operable to seize the stuffed envelope upon continued movement of said material engaging members to the discharge position, means driven by said intermittent drive means in timed relation to the movement of said material engaging members to the discharge position operable to actuate said grippers to remove the stuffed envelope from said material engaging members and discharge the envelope in a stack, and means responsive to the placement of material in said supply station to effect operation of said intermittent drive means.

3. In an envelope stuffing machine, the combination with a material supply station, an envelope supply hopper spaced from and aligned with said material supply station having opened flap envelopes supported therein, a conveyor movable in a path below said supply station and said supply hopper, material engaging members carried by said conveyor movable therewith relative to said supply station and said supply hopper, a cyclically operable drive means for controlling operation of said conveyor to move said engaging members from an at-rest position to pick up material in said supply station, to open the lowermost envelope in said supply hopper and insert the material therein and to thereafter remove the stuffed envelope from said supply hopper to a discharge position, a gripper means positioned adjacent the discharge end of said conveyor operable to receive the stuffed envelope for placement in a stacked position, said material engaging members being operative upon movement to the discharge position to transfer the stuffed envelope to said gripper means, and means driven by said cyclically operable drive means in timed relation to the movement of said conveyor operable to effect operation of said gripper means to transport and release the stuffed envelope in a stacked position.

4. In an envelope stuffing machine having a moving means, a cyclically operable drive means for controlling operation of said moving means, a material supply station positioned adjacent said moving means, an envelope supply hopper for supporting a stack of envelopes with flaps extended, said supply hopper being positioned adjacent the path of travel of said moving means spaced from said supply station with the envelope flaps extended toward said supply station, a stacking means including grippers for discharging the stuffed envelopes in a stacked relationship, and a feeding mechanism for conveying material from said supply station for insertion in the lowermost envelope in said supply hopper, the combination comprising feed members carried by said moving means operable upon operation of said cyclically operable drive means to convey material from said supply station to said supply hopper, means operable to control operation of said feed members to open the lowermost envelope in said supply hopper and to insert the conveyed material thereinto during operation of said moving means and to thereafter effect a transfer of the stuffed envelope from said supply hopper to said grippers, and means driven by cyclically operable drive means for controlling operation of said stacking means in timed relation to the operation of said moving means and the transfer of the stuffed envelope to said grippers.

5. In an envelope stuffing machine having a conveyor means, a cyclically operable drive means for said conveyor means, a material supply station, means responsive to the placement of material in said supply station to effect operation of said cyclically operable drive means, an envelope supply hopper for supporting an envelope with flap open, said material supply station and said envelope supply hopper being positioned adjacent said conveyor means with the open flap extended toward said supply station, a gripping means movable from an envelope receiving position to an envelope stacking position, and a material feeding mechanism for conveying material from said material supply station, inserting the material in an envelope and thereafter effecting stacking of the stuffed envelope, the combination comprising feeding devices carried by said conveyor means for conveying material from said supply station to said supply hopper adjustable to the plane of travel of said conveyor means to open the mouth of the envelope in said supply hopper, means operable to control the adjustment of said feeding devices during operation of said conveyor means to enable the introduction of the feeding devices and material conveyed thereby into the envelope in said supply hopper, said control means being operable upon continued movement of said conveyor means to remove the stuffed envelope from said supply hopper for transfer to said gripping means, and means driven by said cyclically operable drive means operative to control an intermittent movement of said gripping means subsequent to the transfer of the stuffed envelope thereto to move the envelope to stacking position.

6. In an envelope stuffing machine, a framework, a material supply station mounted on said framework, an envelope supply hopper for supporting envelopes mounted on said framework in spaced relationship to said material supply station, a stocking tray, a conveyor means including feeding devices movable in a path to convey material from said material supply station to said envelope supply hopper and operable to open the mouth of the lowermost envelope in said supply hopper and insert the conveyed material thereinto and to remove the stuffed envelope from said supply hopper, means for controlling cyclic operation of said conveyor means and the movement of said feeding devices through said path, a transfer means for receiving the stuffed envelope from said feeding devices upon removal of the envelope from said supply hopper and operable in the next cycle of operation of said control means to move in a path intersecting said stacking tray to discharge the envelope in an edgewise stacking arrangement, and means driven by said cyclic control means operable to control operation of said transfer means in timed relation to the operation of said conveyor means.

7. In apparatus of the character defined in claim 6, said feeding devices comprising a shaft adjustably supported for rocking movement on said conveyor means, a plurality of feed members secured on said shaft extended in the path of travel and in the direction of movement of said conveyor means, means associated with each of said feed members adjustable similarly to accommodate material of varying widths, and means for controlling adjustment of said shaft during operation of said conveyor means to rock said feed members for effecting removal of the stuffed envelope from said envelope hopper.

8. In apparatus of the character defined in claim 7, said adjustable means comprising a hook member for engaging the trailing edge of material as the feed members pass through the material supply station, a plate for supporting said hook member manually slidable longitudinally of said feed member to each of a plurality of positions, and a detent means associated with said plate operable to resiliently retain said plate in each adjusted position.

9. In apparatus of the character defined in claim 7, said adjustment controlling means comprising a control plate mounted in said framework with one planar surface thereof adjacent and parallel to the path of travel of said conveyor means and having a cam track therein, and a cam follower means secured on said shaft adapted for travel in said cam track, the configuration of said cam track controlling the operation of said feed members to remove the stuffed envelope from said supply hopper in timed relation to the insertion of material into the envelope and to transfer the stuffed envelope to said transfer means.

10. In apparatus of the character defined in claim 6, said transfer means comprising a shaft mounted in said framework transversely of the direction of movement of said conveyor means, a plurality of blade members secured on said shaft in spaced parallel relationship axially of said shaft, and a gripper carried by each of said blade members normally directed toward the path of travel of said feeding devices for co-operation with said feeding devices, each said gripper being angularly disposed on the corresponding blade in accordance with the angular disposition of the other and operable to seize the stuffed envelope upon removal thereof by said feeding devices from said supply hopper to effect stacking of the stuffed envelope in an edgewise arrangement upon operation of said driven means.

11. In apparatus of the character defined in claim 10, said driven means comprising a first gear carried by said shaft, a second gear supported in said framework meshing with said first gear, and an intermittent driving means driven by said cyclic controlling means adapted to impart rotation to said second gear in timed relation to the removal of the stuffed envelope from said supply hopper and the transfer thereof to said grippers by said feeding devices whereby the stuffed envelope is transported to an edgewise stacking position by said grippers in the next succeeding machine cycle of operation.

12. A machine for stuffing inserts into envelopes wherein the inserts are conveyed from a supply station at one end of the machine into an opened mouth envelope and the stuffed envelope is discharged to a stacked position at the other end of the machine, the combination comprising an envelope hopper, a conveyor means, feeding devices carried by said conveyor means for transporting an insert from the supply station and operative during operation of said conveyor means to open the mouth of the lowermost envelope in said hopper and to introduce the insert thereinto, a stacking means including grippers for seizing the stuffed envelope during continued operation of said conveyor means for discharge to a stacking position, a cyclic drive means for controlling operation of said conveyor means and for effecting an intermittent operation of said stacking means, and means operable to control operation of said feeding devices to remove the stuffed envelope from said envelope hopper and to transfer the stuffed envelope to said grippers for discharge to a stacking position during intermittent operation of said stacking means.

13. A machine for stuffing inserts into envelopes wherein the inserts are conveyed from one end of the machine into an opened mouth envelope and the stuffed envelope is discharged to a stacked position at the other end of the machine, the combination comprising a framework, an insert supply station supported in said framework at one end of the machine, an envelope supply hopper supported in said framework intermediate the ends of the machine and in alignment with said supply station, an endless conveyor means having its upper run below and adjacent said supply station and said supply hopper, a drive means for said conveyor means, a cyclic clutch for controlling operation of said drive means for a machine cycle of operation, an electromagnetic means for effecting engagement of said clutch, a normally inoperative magnetic switch control means responsive to placement of inserts in said supply station to effect operation of said electromagnetic means, a stacking means disposed at the other end of said machine adjacent the end of said conveyor means, said stacking means including grippers for receiving and discharging a stuffed envelope, a plurality of sets of insert feeding elements, a plurality of adjustable means carried by said endless conveyor means in equally spaced relationship lengthwise of said conveyor means, each of said adjustable means supporting one end of a corresponding set of said feeding elements extending lengthwise in the direction of movement of said conveyor means and operable to control a rocking movement of said feeding elements during operation of said conveyor means, an adjustable hook member associated with each feeding element of each of said sets of feeding elements adapted for similar adjustment lengthwise of the feeding elements and operable to convey inserts of varying widths upon operation of said conveyor means and the passage of each set of feeding elements through said insert supply station, a plate member secured in said framework having a planar surface thereof adjacent and parallel to the path of travel of said conveyor means, a cam track within the planar surface of said plate, a cam follower carried by each of said adjustable means for movement within said cam track operable upon each operation of said conveyor means to rock the corresponding set of said insert feeding elements to enable the feeding elements to open the lowermost envelope in said supply hopper and introduce the insert carried thereby, to remove the stuffed envelope from said supply hopper and to transfer the stuffed envelope to the grasp of said grippers, a stacking table mounted on said framework having slots therein for the passage of said grippers therethrough, an intermittent control means driven by said drive means operable during a predetermined phase of each machine cycle of operation to effect operation of said stacking means and the passage of said grippers through the slots in said table whereby the engagement of a stuffed envelope with the table causes the removal of the stuffed envelope from the grasp of said grippers, and means associated with each of said adjustable means operable subsequent to the transfer of a stuffed envelope to the grasp of said grippers to restore said magnetic switch control means to the normal inoperative position to terminate operation of said cyclic clutch.

14. A machine for stuffing inserts into envelopes wherein the inserts are conveyed from one end of the machine into an opened mouth envelope and the stuffed envelope is discharged to a stacked position at the other end of the machine, the combination comprising a framework, an insert supply station supported in said framework at one end of the machine, an envelope supply hopper supported in said framework in alignment with said supply station, a pair of shafts supported in axially parallel relationship in said framework, a pair of pulleys on each of said shafts, each pulley on one of said shafts being aligned with the corresponding pulley on the other of said shafts, an endless conveyor belt carried by each pair of corresponding pulleys in parallel relationship one with the other, a drive means for one of said shafts controlling movement of said belts, a cyclic clutch for controlling operation of said drive means for a machine cycle of operation, means for effecting engagement of said clutch, a normally inoperative clutch control means movable to an operative position in response to placement of inserts in said supply station to effect operation of said clutch engagement means, a magnetic means for releasably maintaining said clutch control means in either the inoperative or operative position, a stacking means disposed at the discharge end of said machine, said stacking means including grippers for receiving and discharging a stuffed envelope, a plurality of rods supported for rocking movement between said belts in equally spaced relationship lengthwise of said belts and axially parallel to said shafts and to each other, a series of insert feeding elements mounted on each of said rods having a portion thereof extending lengthwise in the direction of movement of said belts passable beneath said supply station and said supply hopper upon operation of said belts, a projection on each feeding element of each series of feeding elements operable to pick up an insert in said supply station for conveyance to said supply hopper and said stacking means, a cam-controlled means associated with each of said rods to control the rocking movement of said rods in timed relation to the movement of each corresponding series of insert feeding elements to the supply hopper for the introduction of the leading end of the series of feeding elements and the subsequent stuffing of the insert conveyed thereby into the mouth of the lowermost envelope in said supply hopper, said cam-controlled means being operative upon continued movement of said belts to rock the corresponding feeding elements to dislodge the stuffed envelope from the supply hopper and transfer the stuffed envelope into the grasp of said grippers, and means carried by each of said rods for restoring said clutch control means to the normally inoperative position rendered operable by each successive rod subsequent to the transfer of a stuffed envelope to said grippers.

15. A machine for stuffing inserts into envelopes wherein the inserts are conveyed from one end of the machine into an opened mouth envelope and the stuffed envelope is discharged to a stacked position at the other end of the machine, the combination comprising an insert supply station at one end of the machine, an envelope supply hopper positioned intermediate the ends of the machine and in alignment with said supply station, an endless conveyor means having its upper run below and adjacent said supply station and said supply hopper, a stacking means disposed at the other end of said machine, a cyclically operable means for driving said conveyor means and said stacking means, a plurality of adjustable feeding elements carried by said endless conveyor means, each of said adjustable feeding elements having a projection associated therewith aligned transversely of said conveyor means and operable to pick up an insert upon passage of said conveyor means below said insert supply station, and a cam controlled means operable to adjust said feeding elements during movement of said conveyor means to open the mouth of an envelope in said supply hopper and stuff the conveyed insert therein and, upon continued movement of said conveyor means, to remove the stuffed envelope from said supply hopper and transfer it to said stacking means.

References Cited by the Examiner
UNITED STATES PATENTS

| | | | |
|---|---|---|---|
| 1,610,965 | 12/1926 | Ranney et al. | 53—189 X |
| 1,754,831 | 4/1930 | Marsh | 53—188 |
| 2,301,354 | 11/1942 | Alden | 53—188 X |
| 2,746,221 | 5/1956 | Rouan et al. | 53—266 X |
| 2,771,726 | 11/1956 | Owen et al. | 53—266 X |
| 2,835,090 | 5/1958 | De Maine | 53—189 |
| 2,914,895 | 12/1959 | Martin | 53—186 X |
| 3,253,384 | 5/1966 | Huck et al. | 53—190 X |

TRAVIS S. McGEHEE, *Primary Examiner.*

FRANK E. BAILEY, N. A. ABRAMS,
*Assistant Examiners.*